United States Patent [19]

Kubo et al.

[11] Patent Number: 5,625,514
[45] Date of Patent: Apr. 29, 1997

[54] DISK DEVICE

[75] Inventors: Takeshi Kubo, Kanagawa; Kenji Enomoto, Saitama, both of Japan

[73] Assignee: Sony Corporation, Tokyo, Japan

[21] Appl. No.: 489,006

[22] Filed: Jun. 8, 1995

Related U.S. Application Data

[63] Continuation of Ser. No. 165,884, Dec. 14, 1993, abandoned.

[51] Int. Cl.⁶ .................................................. G11B 5/54
[52] U.S. Cl. ............................................ 360/104; 360/105
[58] Field of Search ............................. 360/104, 105, 360/103, 106, 97.01

[56] References Cited

U.S. PATENT DOCUMENTS

| | | | |
|---|---|---|---|
| 4,709,285 | 11/1987 | Enami et al. | 360/104 |
| 4,752,848 | 6/1988 | Garcia et al. | 360/105 |
| 4,755,892 | 7/1988 | Carteau et al. | 360/105 |
| 4,870,703 | 9/1989 | Augeri et al. | 360/105 |
| 4,933,785 | 6/1990 | Morehouse et al. | 360/105 |
| 5,027,241 | 6/1991 | Hatch et al. | 360/105 |
| 5,079,660 | 1/1992 | Yumura et al. | 360/104 |
| 5,189,575 | 2/1993 | Onooka et al. | 360/105 |
| 5,237,472 | 8/1993 | Morehouse et al. | 360/105 |
| 5,383,073 | 1/1995 | Masukawa et al. | 360/104 |

FOREIGN PATENT DOCUMENTS

| | | |
|---|---|---|
| 0089277 | 9/1983 | European Pat. Off. . |
| 0264775 | 4/1988 | European Pat. Off. . |
| 57-82252 | 5/1982 | Japan .................................. 360/103 |
| 61-96509 | 5/1986 | Japan .................................. 360/103 |
| 2237920 | 5/1991 | United Kingdom . |
| WO92/11630 | 7/1992 | WIPO . |

OTHER PUBLICATIONS

Patent Abstracts of Japan, vol. 14, No. 508 (P-1128) 7 Nov. 1990 & JP-A-02 210 677 (Hitachi) 22 Aug. 1990.

*Primary Examiner*—Stuart S. Levy
*Assistant Examiner*—David L. Ometz
*Attorney, Agent, or Firm*—William S. Frommer; Alvin Sinderbrand

[57] ABSTRACT

A disk device for moving an arm which supports a head slider and for positioning the head slider at a predetermined position of a disk, includes a suspension fixed at one end to the arm; a flexure which is provided in the vicinity of the other end of the suspension and on which the head slider is mounted; a spherical projection provided to project toward the disk at the end beyond the flexure mount position of the suspension; a slant base provided with a slant surface having an increasing distance from the disk in accordance with a radial outward distance of the disk; and a drive source for moving the arm so that the projection is moved in engagement with the slant surface in loading and unloading.

26 Claims, 30 Drawing Sheets

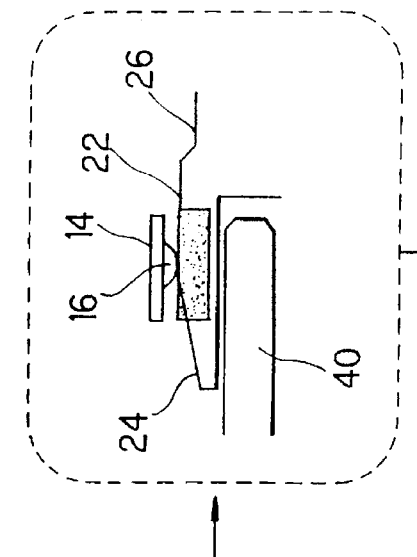
FIG.6A  FIG.6B  FIG.6C
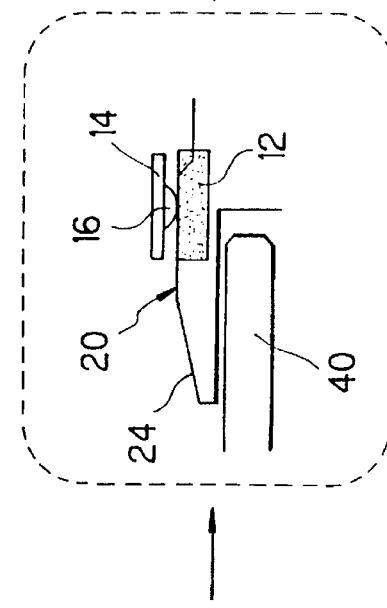
FIG.6D  FIG.6E  FIG.6F
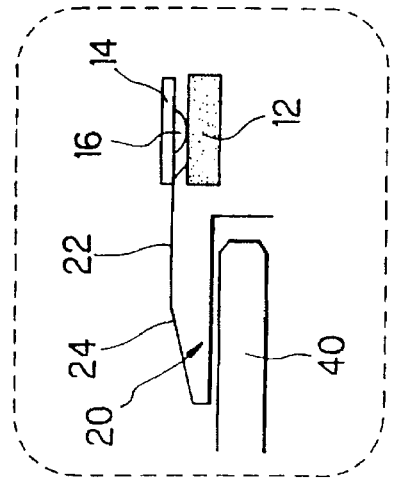
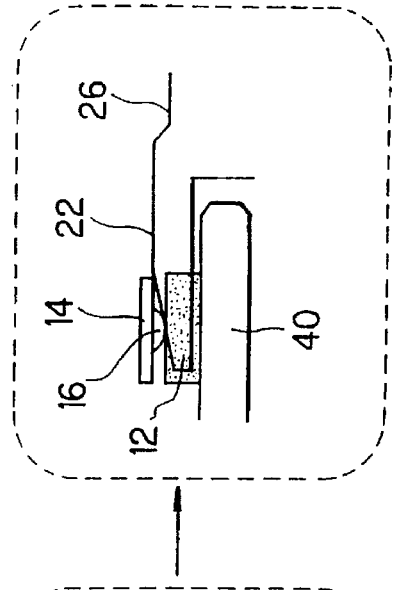
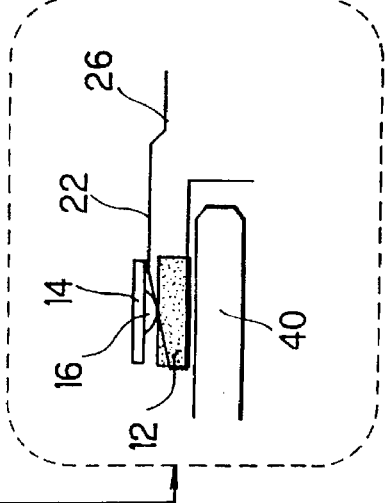

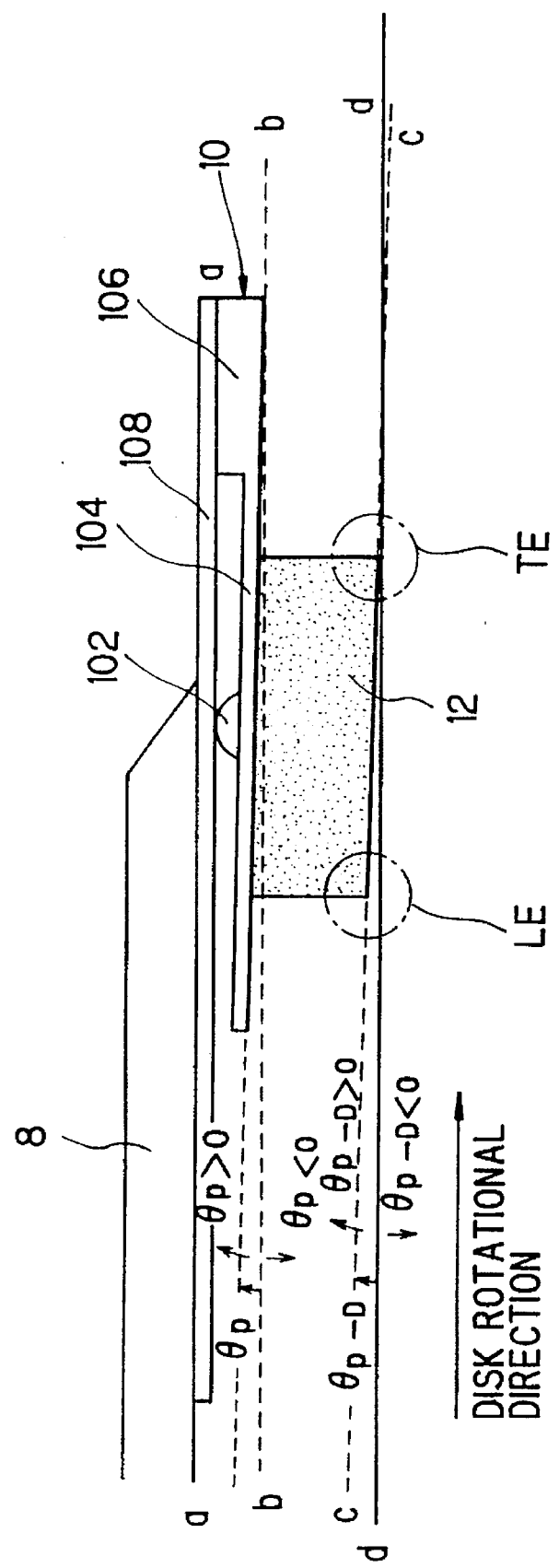

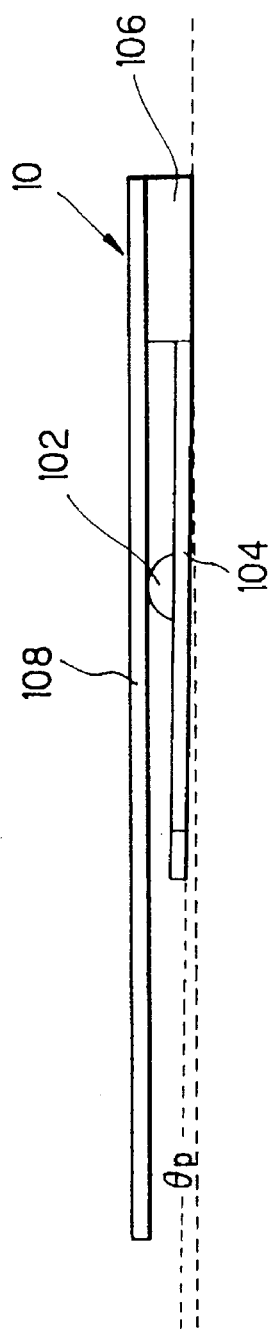
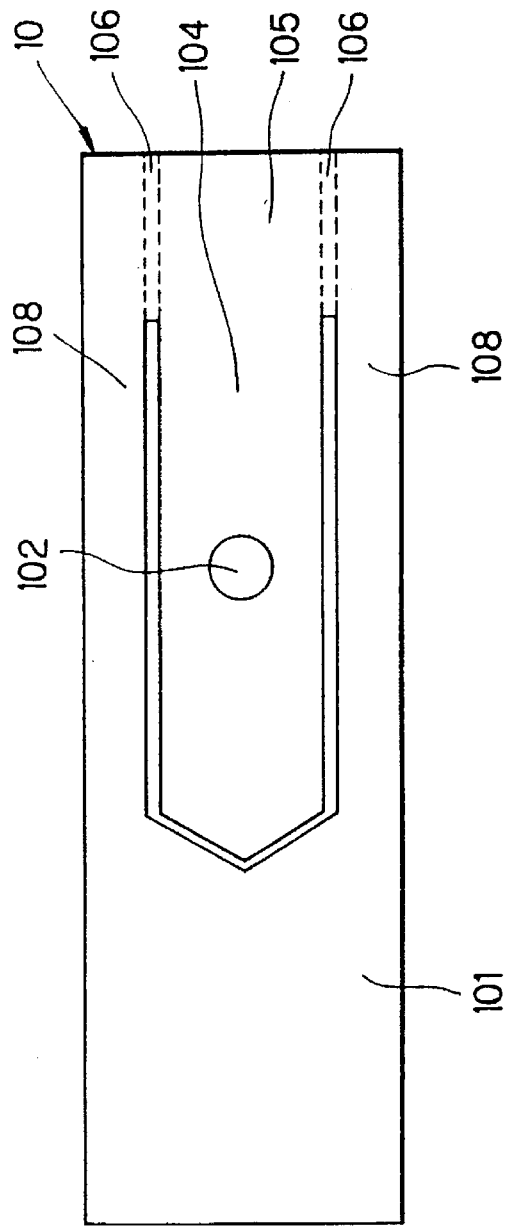
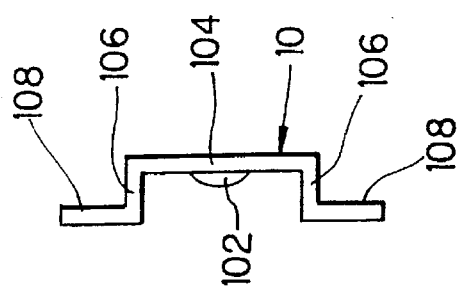

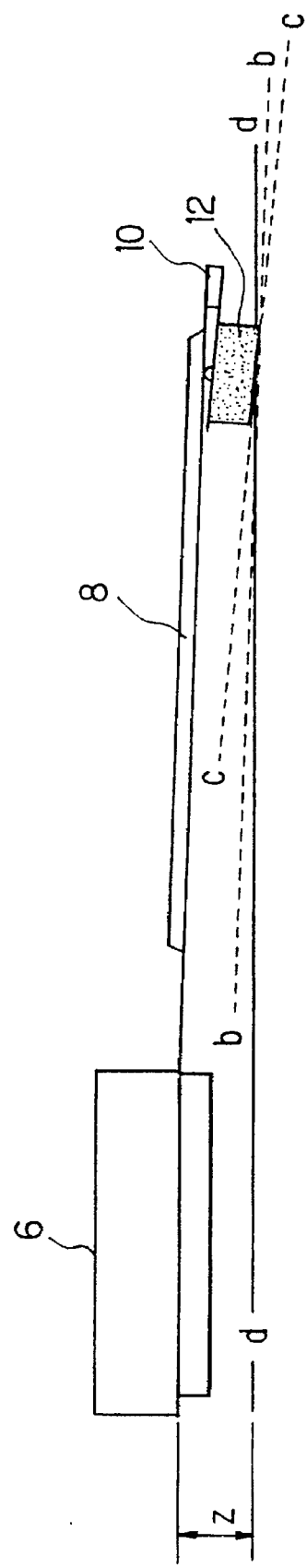

DISK DEVICE

This application is a continuation of application Ser. No. 08/165,884, filed Dec. 14, 1993, now abandoned.

BACKGROUND OF THE INVENTION

1. Field of the Invention

The present invention relates to a disk device for moving an arm which supports a head and for positioning the head in a desired position.

2. Description of the Prior Art

Generally, a CSS (Contact Start Stop) system is applied to presently used magnetic hard disk devices. In this system, when a magnetic hard disk is stopped, a magnetic head is in contact with a disk surface, and the magnetic head is lifted in accordance with the rotation of the disk.

U.S. Pat. No. 4,933,785 discloses an N-CSS (Non-Contact Start Stop) type magnetic hard disk device. In the device, a cam follower member is provided inside a head slider on a surface, on a disk side, of a head support suspension of a rotary actuator assembly (i.e., on an actuator coil side), and a cam surface assembly is provided in the vicinity of an outer peripheral portion of the disk. During the unloading, the rotary actuator assembly is moved outside the disk and the cam follower member is brought into contact with the cam surface. Thereafter, the rotary actuator assembly is moved along the cam surface and is held stationary in a lock position.

Also, U.S. Pat. No. 5,027,241 discloses an N-CSS type magnetic hard disk device. In this device, a cylindrical loading tab is provided at a tip end of a head supporting suspension of a rotary actuator assembly, and a loading slant structure is provided in the vicinity of an outer peripheral portion of the disk. During the unloading, the rotary actuator assembly is moved to outside of the loading slant structure and the loading tab is brought into contact with the slanted surface of the loading slant structure. Thereafter, the rotary actuator assembly is moved along the slant surface and is held stationary in a parking region.

The Japanese Mechanical Association (No. 900–52) Lecture Paper (1990, August 23 and 24, Tokyo, Mechatronics), 204, entitled "The Load/Unload Dynamics for In-line Type Flying Head Systems in Magnetic Disk Storage" shows measurement examples relating to the contact/non-contact in an N-CSS system. In the measurement examples, however, the load/unload operation of the slider is carried out by an arm which carries a suspension. This system is different from that of the present invention. Also, the paper shows the measurement examples in which it was measured whether or not the slider was brought into contact with the disk surface at a loading speed of 80 mm/s and 40 mm/s and at an unloading speed of 5 mm/s. However, the paper is silent with respect to the preferable numerical range. With respect to the posture of the slider, the paper describes that it is preferable for the non-contact loading to adapt the case where the pitch angle is zero or positive, but does not disclose a specific measure at all as to how the positive pitch angle is attained.

In the conventional CSS magnetic hard disc device, liquid contained with the device would adhere to the disc surface so that an attraction phenomenon (stick). In order to avoid this, a texture which roughens the disc surface is formed, but this is opposite to the basic demand that the magnetic head should be close to the magnetic film of the disc as much as possible and is also contradictory to the future demand that the recording should be carried out at higher and higher density.

Also, in the N-CSS system disclosed in the above-described U.S. Pat. No. 4,933,785, the cam follower member is provided inside the head slider, and therefore, during the unloading, a large force is necessary to lift up the head slider.

Also, if the cylindrical loading tab is used as shown in the above-described U.S. Pat. No. 5,027,241, the sliding area with the loading slant structure is increased. As a result, contamination due to the wear powder or the like would occur. Also, the loading tab is made cylindrical, it is necessary to enhance the positional precision of the loading slant structure.

Also, in the loading and unloading of the conventional N-CSS type magnetic hard disk drive, as shown in FIG. 41, a leading end LE of a head slider 12P mounted through a flexure 10P on a suspension 8P is provided closer to the disk 40 than a trailing end TE. Accordingly, it takes such an angle/posture that the leading end LE is projected toward the disk surface earlier than the trailing end TE. Namely, since the leading end LE of the head slider 12P is closer to the disk 40 than the trailing end TE, a dynamic pressure would hardly occur between the disc 40 and the head slider 12P, and the disk 40 would be likely to contact (collide) with the head slider 12P.

SUMMARY OF THE INVENTION

In view of the foregoing difficulties, a first object of the present invention is to provide an N-CSS type disk device in which a contamination due to a sliding wear is small, it is unnecessary to unduly increase a positional precision of mechanical parts, and a large lifting force is unnecessary in unloading.

A second object of the present invention is to provide a disk device in which a loading loss may be obviated.

A third object of the invention is to provide a disk device in which a fear that a head slider would be brought into contact with a disk may be suppressed.

A fourth object of the invention is to provide a disk device in which a collision energy may be reduced even if the head slider would be brought into contact with a disk.

In a first disk device according to the present invention, a disk device for moving an arm which supports a head slider and for positioning the head slider at a predetermined position of a disk, comprises: a suspension fixed at one end to the arm; a flexure which is provided in the vicinity of the other end of the suspension and on which the head slider is mounted; a spherical projection provided to project toward the disk at the end beyond the flexure mount position of the suspension; a slant base provided with a slant surface having an increasing distance from the disk in accordance with a radial outward distance of the disk; and a drive means for moving the arm so that the projection is moved in engagement with the slant surface in loading and unloading.

The projection may be formed on a projection carrying plate which is discrete from the suspension, the projection carrying plate being fixed to the suspension or otherwise the projection is formed integrally with the suspension.

In at least one of the loading and unloading operations, a speed of the head slider in a direction perpendicular to a surface of the disk is not higher than 10 mm/sec but not lower than 3 mm/sec.

In a second disk device according to the present invention, a disk device for moving an arm which supports a head slider and for positioning the head slider at a predetermined position of a disk, comprises: a suspension fixed at one end to the arm; a flexure which is provided in the vicinity of the other end of the suspension and on which the head slider is mounted; a slant base provided with a slant surface having an increasing distance from the disk in accordance with a radial outward distance of the disk and a recess portion for stopping the head slider; and an engagement portion provided in the suspension for engaging with the slant base in loading and unloading; wherein a height of the recess portion of the slant base is selected so that a height of the head slider when the engagement portion is located in the recess portion is equal to a height of the head slider when the head slider effects a writing operation and a reading operation relative to the disk.

In a third disk device according to the present invention, a disk device for moving an arm which supports a head slider and for positioning the head slider at a predetermined position of a disk, comprises: a suspension fixed at one end to the arm; and a flexure which is provided in the vicinity of the other end of the suspension and on which the head slider is mounted; wherein an angle is selected for the head slider mount surface of the flexure so that a spaced distance of a leading end of the head slider relative to the disk is longer than a spaced distance of a trailing end of the head slider relative to the disk.

It is preferable that the angle for the head slider mount surface of the flexure be approximately 0.3 degrees.

In a fourth disk device according to the present invention, a disk device for moving an arm which supports a head slider and for positioning the head slider at a predetermined position of a disk, comprises: a suspension fixed at one end to the arm; a flexure which is provided in the vicinity of the other end of the suspension and on which the head slider is mounted; and a control means for controlling a rotational speed of the disk so that the rotational speed is not lower than a flying minimum speed of the head slider and is lower than a normal constant speed in at least one of loading and unloading.

According to the first disk device, in the loading and unloading operations, the spherical projection provided to project toward the disk at one end of the suspension beyond the flexure mount position is brought into sliding contact with the slant surface of the slant base. Since the projection is located at the end of the suspension beyond the flexure mount position, it is possible to reduce a force for lifting the head slider in the unloading operation. Also, since the projection is spherical, the projection is brought into point contact with the slant surface to reduce a sliding area, suppress the contamination due to the sliding movement and make the sliding resistance stable. In addition, since the projection is spherical as mentioned above, the slant surface is brought into point contact with the projection, so that a strictly high positional precision for the slant base is not necessary. Furthermore, since the suspension is brought into engagement with the slant surface through the spherical projection, it is possible to keep the head slider supported by the suspension in parallel to the disk.

According to the second disk device, the height of the head slider when the projection of the suspension is located in the recess portion is equal to the height of the head slider when the head slider effects the writing operation and the reading operation to the disk. Accordingly, the load to be applied to the suspension uniformly in the normal constant operation and the locking state (i.e., parking state), it is possible to eliminate the load loss.

According to the third disk device, an angle is applied to the head slider mount surface of the flexure, the distance of the leading end of the head slider to the disk is always longer than the distance of the trailing end of the head slider thereto in the loading and unloading operation. Accordingly, the dynamic pressure due to the aerial film between the slider and the disk surface is likely to occur, and hence the lifting force occurs even if the slider is located at a relatively high level, it is possible to loading and unloading without any contact between the slider and the disk.

According to the fourth disk device, in at least one of the loading and unloading operations, the disk rpm is controlled at a level exceeding the head slider flying minimum speed and less than the normal constant rpm. Within this range, it is possible to reduce the collision energy even if the head slider would be brought into contact with the disk.

BRIEF DESCRIPTION OF THE DRAWINGS

In the accompanying drawings:

FIGS. 6A to 6F are side elevational views showing a series of operational states in the loading action in the embodiment shown in FIG. 1;

FIG. 8 is a side elevational view showing one example of a structure of a suspension, a flexure and a slider of the embodiment shown in FIG. 1;

FIGS. 10A, 10B and 10C are a side elevational view, a plan view and a frontal view showing a detailed structure of the flexure shown in FIG. 8;

FIG. 12 is a bottom view showing an angular relationship among the suspension, flexure and slider in the embodiment shown in FIG. 1;

DESCRIPTION OF THE PREFERRED EMBODIMENTS

Figure 1:
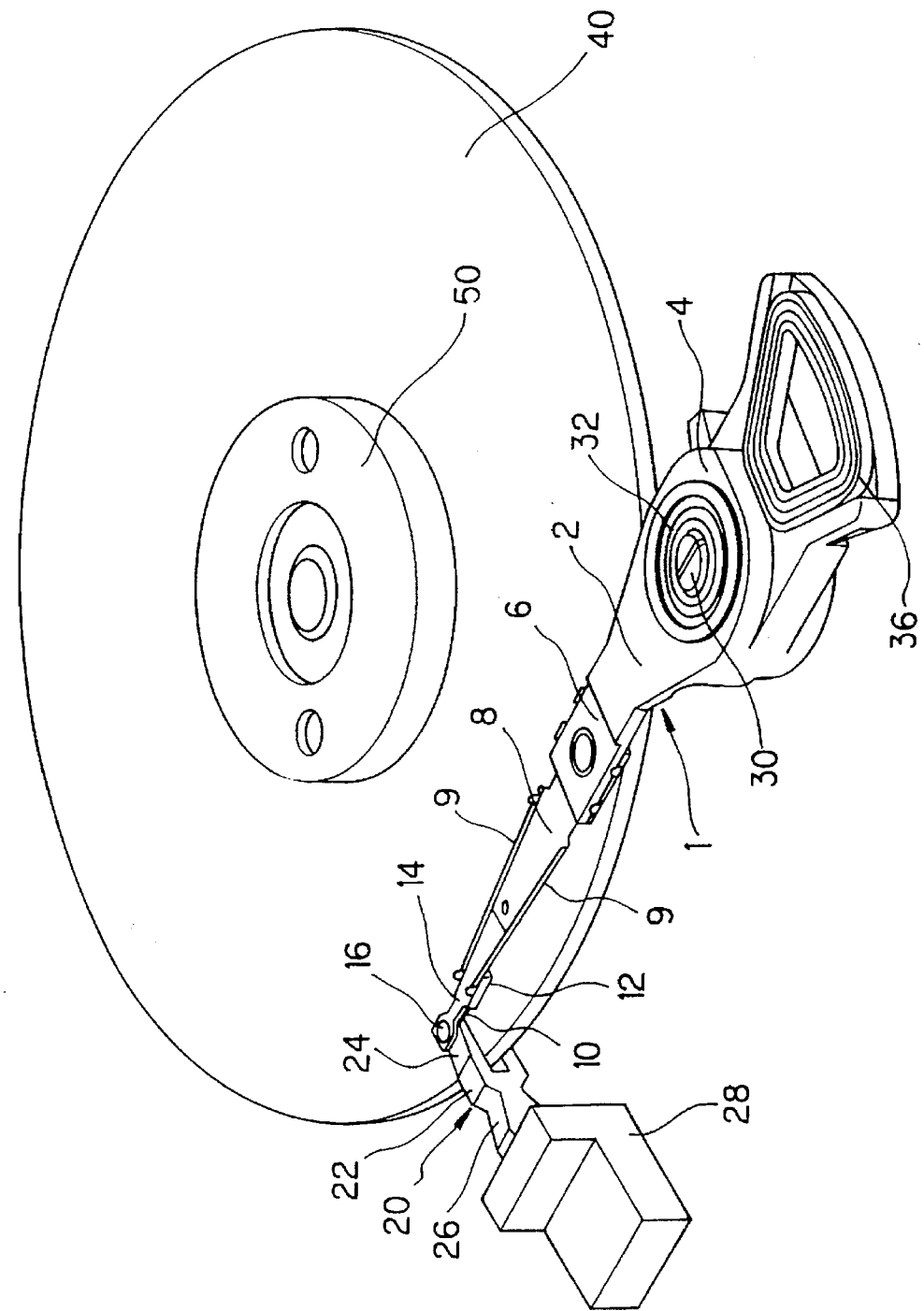
FIG. 1 is a perspective view showing a structure according to a first embodiment of the invention which is applied to a magnetic hard disk drive.
Figure 2:
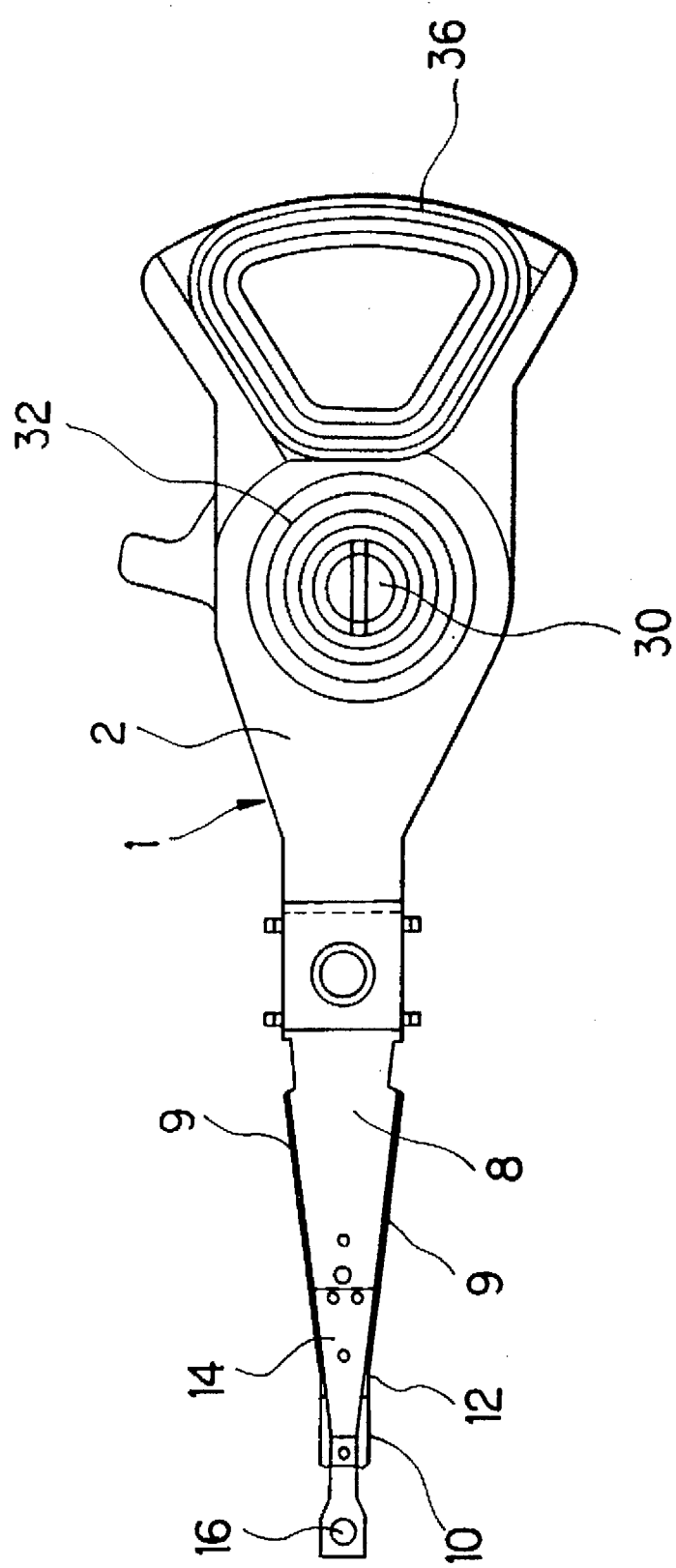
FIG. 2 is a plan view showing one example of a structure of a rotary actuator assembly used in the embodiment shown in FIG. 1.
Figure 3:
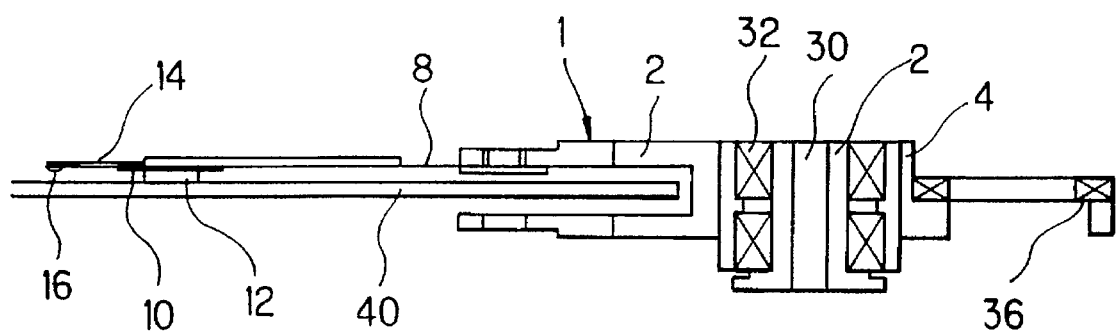
FIG. 3 is a side elevational view showing one example of a structure of the rotary actuator assembly used in the embodiment shown in FIG. 1.

FIG. 1 shows a structure in which the present invention is applied to a magnetic hard disk drive. FIGS. 2 and 3 are a plan view and a side elevational view of an example of a rotary actuator assembly used in the embodiment shown in FIG. 1. A rigid arm 2 of the rotary actuator assembly 1 is made of, for example, aluminum by die-casting. On end of a suspension 8 made of, for example, stainless steel is fixed to a mount region 6 of the rigid arm 2. A pair of flanges 9 are formed at predetermined regions on both sides of the suspension 8. The part of the suspension 8 where the flanges 9 are formed is referred to by a load beam portion, and the other part where the flanges 9 are not formed is referred to by a spring portion. A head slider 12 including a magnetic head is mounted through a flexure 10 on the side of the magnetic hard disk 40 in the vicinity of the other end of the suspension 8.

Figure 4:
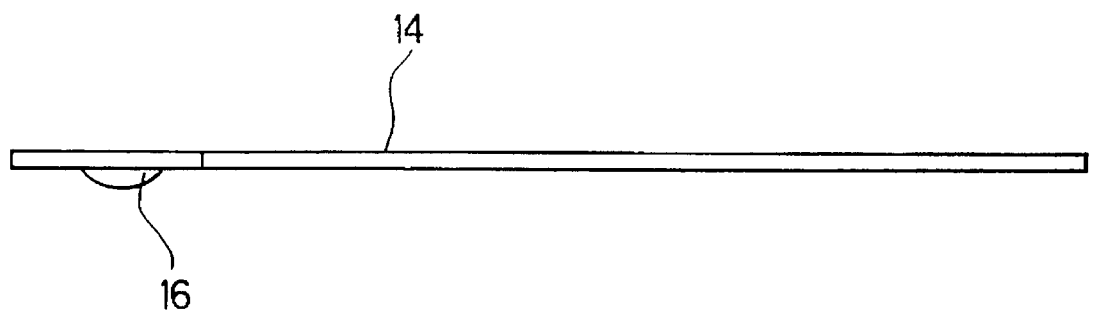
FIG. 4 is an enlarged side elevational view showing a projection carrying plate of the rotary actuator assembly shown in FIG. 3.
Figure 5:
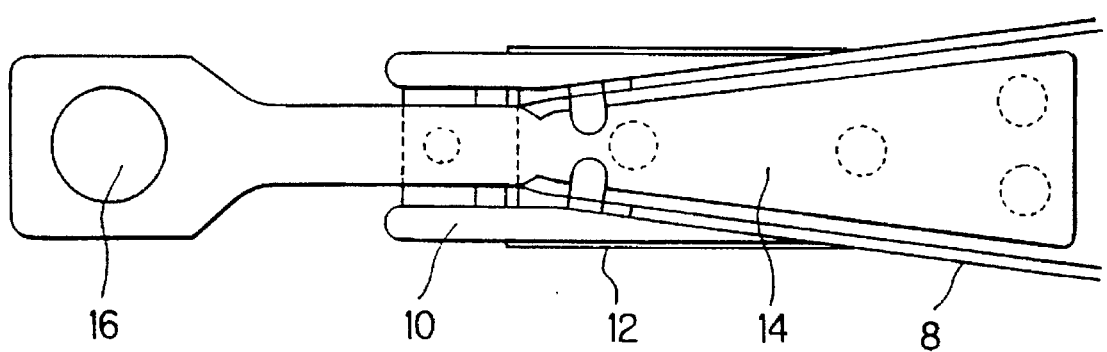
FIG. 5 is an enlarged plan view showing the projection carrying plate of the rotary actuator assembly shown in FIG. 3.

A projection carrying plate 14 is fixed to the opposite side of the magnetic hard disk 40 of the suspension 8. A spherical projection 16 that projects toward the disc 40 is formed at the end portion by the formation of a dimple as shown in FIGS. 4 and 5. The spherical projection 16 is provided at a predetermined position on a longitudinal centerline of the carrying plate 14. The carrying plate 14 is fixed by welding or the like (for example, welds at positions indicated by dotted circles in FIG. 5) so that its longitudinal centerline is aligned with a longitudinal centerline of the suspension 8 and the spherical projection 16 is located further from the suspension 8 than the head slider 12.

A hub portion 4 of the rigid arm 2 of the rotary actuator assembly 1 is coupled rotatably with the fixed shaft 30 through a bearing 32. A VCM (Voice Coil Motor) 36 is provided on a portion which is formed integrally with the hub portion 4 of the rigid arm 2 and which extends opposite the suspension 8 with respect to the fixed shaft 30. The drive force of the VCM 36 causes the arm 2 to rotate about the centerline of the fixed shaft 30 to thereby the head slider 12 at a predetermined position of the magnetic hard disk 40.

A slant base 20 is provided in the vicinity of an outer circumference of the disk 40 and includes a slant surface 24 which is separated away from the surface of the disk 40 in accordance with a radial outward distance of the disk 40, a flat surface 22 which is parallel to the surface of the disk 40 contiguous with the slant surface 24, and a parking recess 26 which is contiguous with the flat surface 22 for defining a lock position of the rotary actuator assembly 1. A height of the recess 26 of the slant base 22 is determined so that a height of the head slider 12 when the projection 16 is positioned in the recess 26 is equal to a height of the head slider 12 when the head slider 12 effects a write/read operation to the disk 40. The slant base 20 is supported by a slant base support member 28 which in turn is fixed to a housing base (not shown).

FIGS. 6A to 6B show a series of loading operation according to the embodiment. First of all, as shown in FIG. 6A, the projection 16 is located in the recess 26 of the slant base 20 and is locked therein (i.e., the projection is positioned in a stay position). At this time, the height of the head slider 12 is equal to that of the head slider 12 when the latter effects the write/read operation to the disk 40. Subsequently, as shown in FIG. 6B, the VCM 36 causes the rigid arm 2 and the suspension 8 to move inwardly of the disk 40 to thereby move the projection 16 from the recess 26 to the flat surface 22. In this case, a lift-up amount of the head slider 12 from the disk 40 is 200 µm. As shown in FIG. 6C, when the projection 16 reaches a load starting position which is a terminal position of the flat surface 22, the VCM 36 has once stopped. Subsequently, the VCM causes the projection 16 to move along the slant surface 24 (see FIG. 6D). Then, as shown in FIG. 6E, the VCM 36 holds the projection 16 on the slant surface 24 until the head slider 12 is subjected to the aerial film pressure from the disk 40. When the head slider 12 is subjected to the aerial film pressure from the disk 40, the VCM 36 causes the projection 16 to move radially inwardly of the disk 40 (see FIG. 6F). Thus, the head slider 12 may be lifted to effect the write/read operation to the disk 40. As described above, the height of the head slider 12 relative to the disk 40 in the stay position shown in FIG. 6A, i.e., in the lock position is equal to the height of the head slider 12 which has been lifted relative to the disk 40 for effecting the writing/reading as shown in FIG. 6F. Accordingly, there is no loading loss.

Figure 7A:
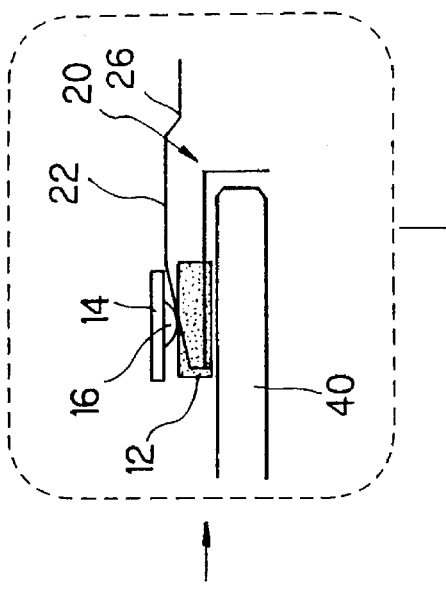
FIGS. 7A to 7F are side elevational views showing a series of operational states in the unloading action in the embodiment shown in FIG. 1.
Figure 7B:
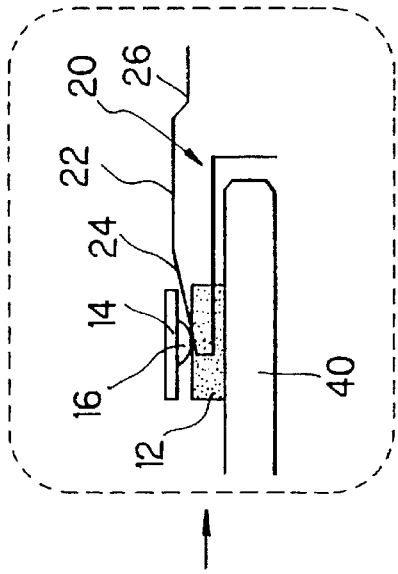
Figure 7C:
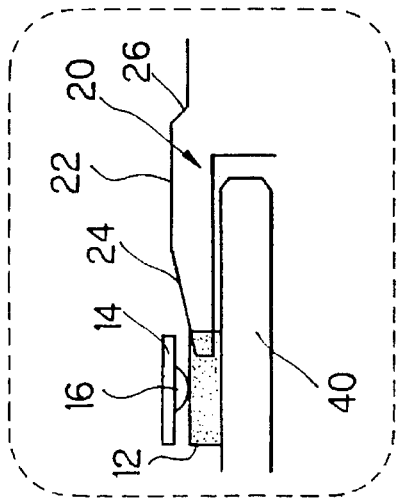
Figure 7D:
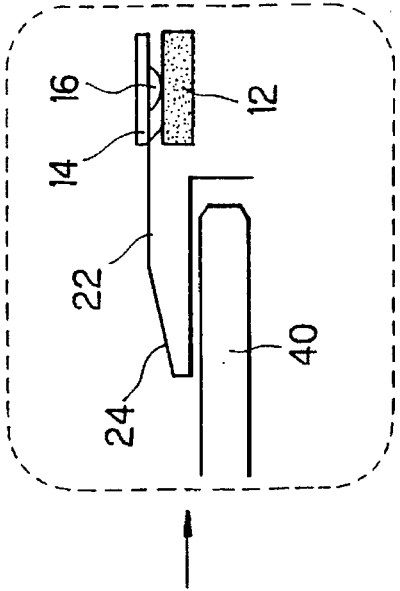
Figure 7E:
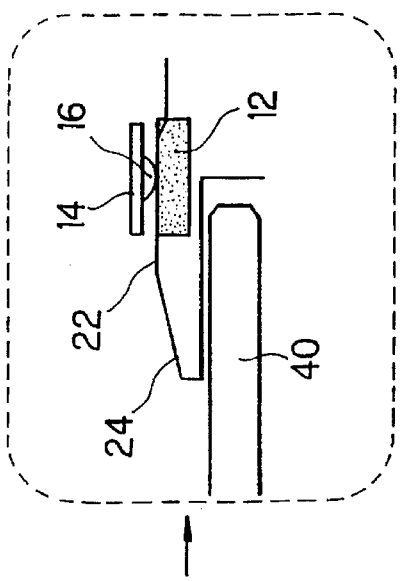
Figure 7F:
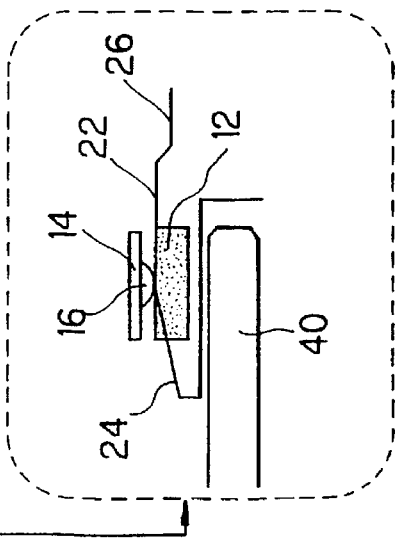

FIGS. 7A to 7F show a series of unloading operation according to the embodiment. First of all, as shown in FIG. 7A, the VCM 36 causes the suspension 8 (hence, the projection 16 and the head slider 12) to stop at a standby position prior to the slant base 20 on the disk 40. Subsequently, as shown in FIG. 7B, the VCM 36 causes the suspension 8 to move to the outer periphery of the disk 40 to thereby engage the projection 16 with the end portion of the slant surface 24. The position at this time is an unload start position. Next, the VCM 36 causes the suspension 8 to further move to the outer periphery of the disk 40, whereby the projection 16 is moved on the slant surface 24 (see FIG. 7C), is moved along the flat surface 22 (see FIG. 7D), is out of the region of the disk 40 (see FIG. 7E), reaches the recess 26 (i.e., in the stay position) and is locked in the recess 26 (see FIG. 7F). As described above, the height of the head slider 12 40 in the standby position shown in FIG. 7A (i.e., the height of the head slider 12 which has been lifted up to effect the writing/reading operation to the disk 40) is equal to the height of the head slider 12 in the stay position, i.e., the lock position as shown in FIG. 7F. Accordingly, there is no loading loss.

Figure 9:
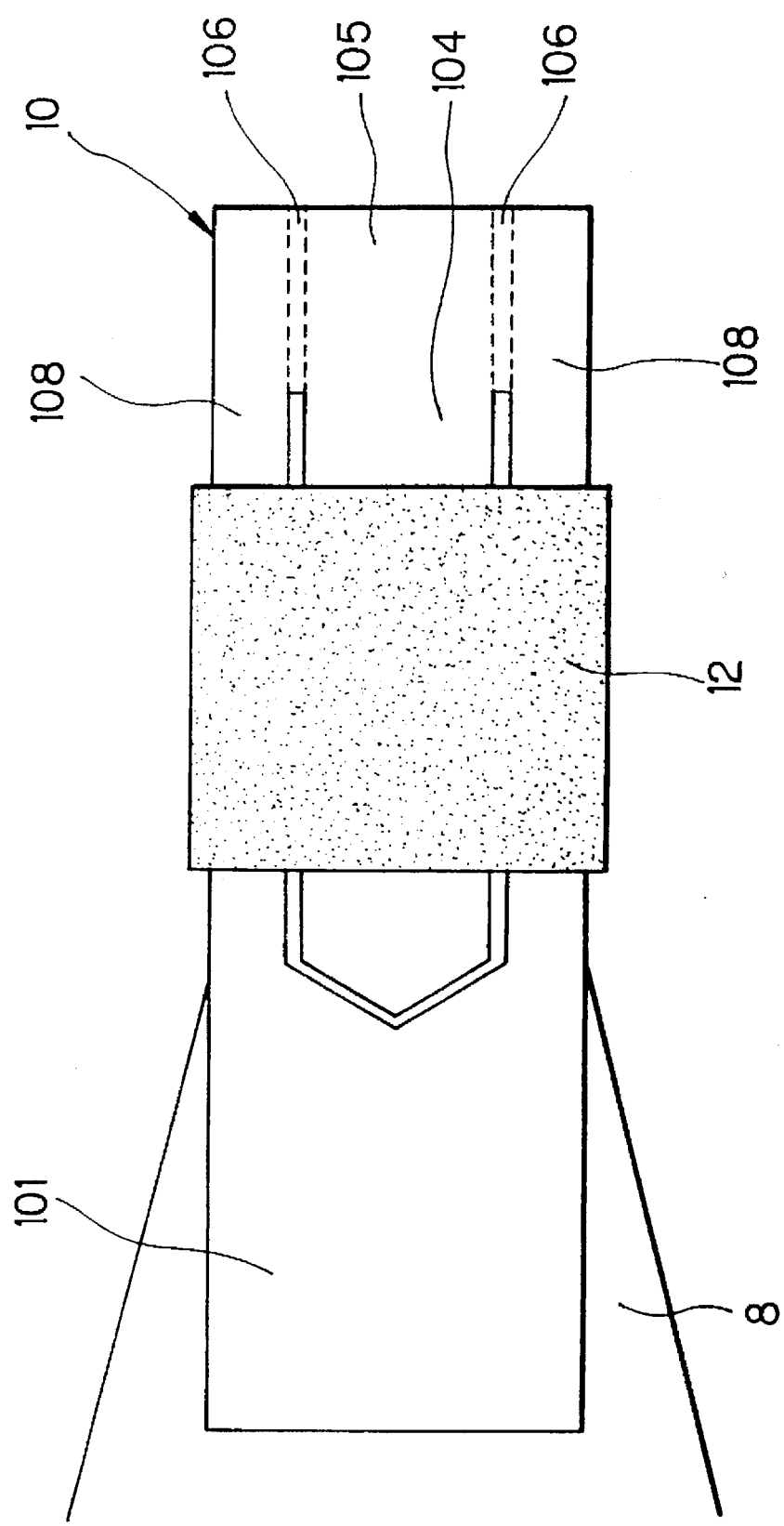
FIG. 9 is a bottom view showing the example of the structure of the suspension, flexure and slider of the embodiment shown in FIG. 1.

FIGS. 8 and 9 are a side elevational view and a bottom view showing an example of the suspension, the flexure and the slider according to the embodiment shown in FIG. 1. FIGS. 10A, 10B and 10C are a side elevational view, a plan view and a frontal view showing a detail of the flexure shown in FIG. 8. The flexure 10 includes a fastening portion 101 fixed to the suspension 8, a tongue portion 104 having a longitudinal centerline aligned with the longitudinal centerline of the suspension 8 and having a surface on the side of the disk 40 on which surface the head slider 12 is mounted, a pair of thin flexible outer fingers 108 extending in parallel to the tongue portion 104 from the fastening portion 101, and a coupling portion 105 for coupling the tongue portion 104 and the fingers 108 through stepped portions 106. Due to the existence of the stepped portions 106, the tongue portion 104 is closer to the disk 40 than the fingers 108. A spherical projection 102 which constitutes a load receiving point for receiving a load from the suspension 8 is formed on a surface of the tongue 104 opposite the disk 40.

The head slider mounting surface of the flexure 10, i.e., the tongue portion 104 has an angle $\theta p$ so that a spaced distance of the leading end LE of the head slider 12 to the disk 40 is longer than a spaced distance of the trailing end TE of the head slider 12 to the disk 40. Namely, the tongue portion 104 has a positive mount pitch angle $\theta p$ relative to the fingers 108. Thus, in order to form such a positive pitch angle $\theta p$, it is sufficient to make the angle $\theta p$ on both the convex and concave pressing dies for the stepped portions 106.

Figure 11C:
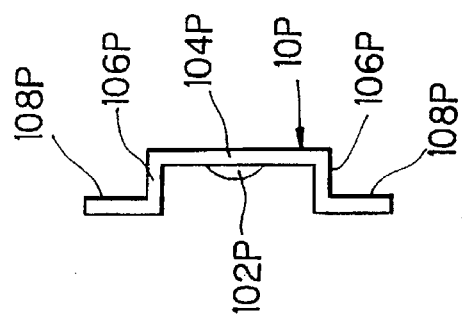
FIGS. 11A, 11B and 11C are a side elevational view, a plan view and a frontal view showing a detailed structure of a conventional flexure.
Figure 11A:
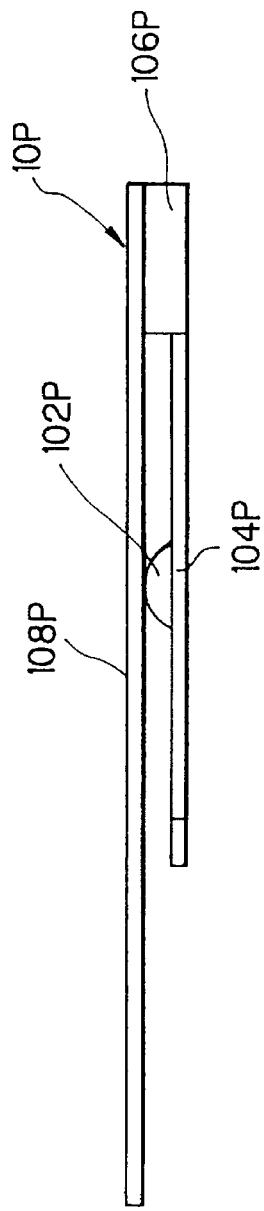
Figure 11B:
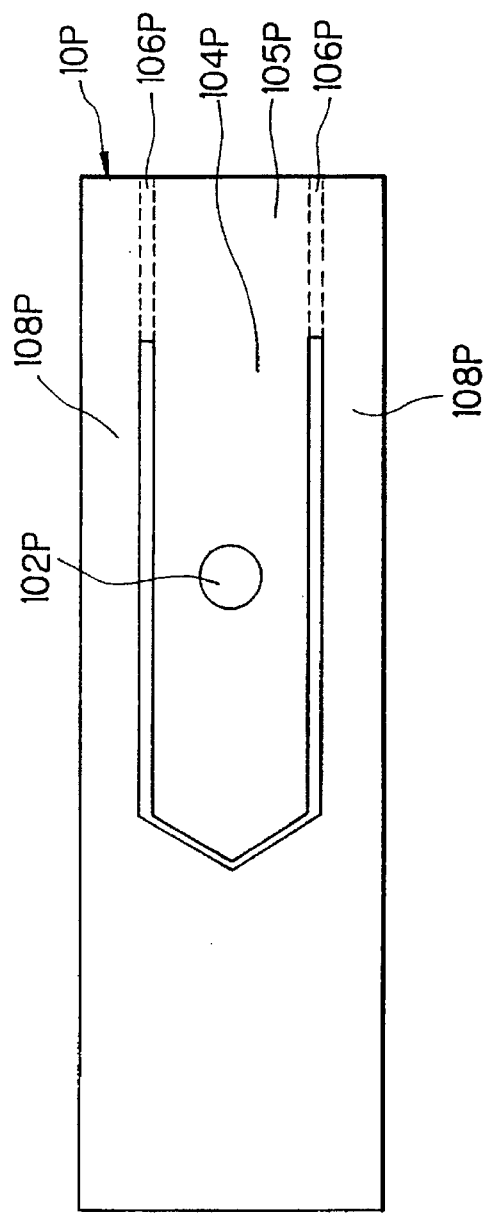

FIGS. 11A, 11B and 11C are a side elevational view, a plan view and a frontal view showing a detail of the conventional flexure. In FIGS. 11A to 11C, the same numerals with a character P are used to indicate the same or like components as those of the flexure according to the present invention shown in FIGS. 11A to 11C. As shown in FIGS. 11A to 11C, the tongue portion 104P of the conventional flexure 10P has no angle $\theta p$ relative to the fingers 108P.

FIG. 12 shows a relationship between the leading end LE and the trailing end TE of the slider 12 and the disk surface in the loading operation and the unloading operation according to the embodiment shown in FIG. 1. Assuming that z is the head mount height (i.e., the height of the arm mount region 6, b—b is the line which is parallel with the suspension 8, c—c is the line which is parallel with the surface of the slider 12, i.e., the tongue 104 of the flexure 10, and d—d is the line representing the disk surface, the pitch angle $\theta p$ is an angle defined by the line c—c and the line b—b. Assuming that $\theta z-D$ is the angle defined by the lines b—b and d—d, i.e., the angle defined by the suspension 8 and the disk surface, the angle ($\theta p-D$) defined by the slider 12 and the disk surface is given as follows:

$$(\theta p-D)=\theta p+(\theta z-D)$$

By mounting the suspension 8 at the height z so as to meet the condition, $\theta p+(\theta z-D)>0$, it is possible to meet the relationship, $(\theta p-D)>0$.

Figure 13:
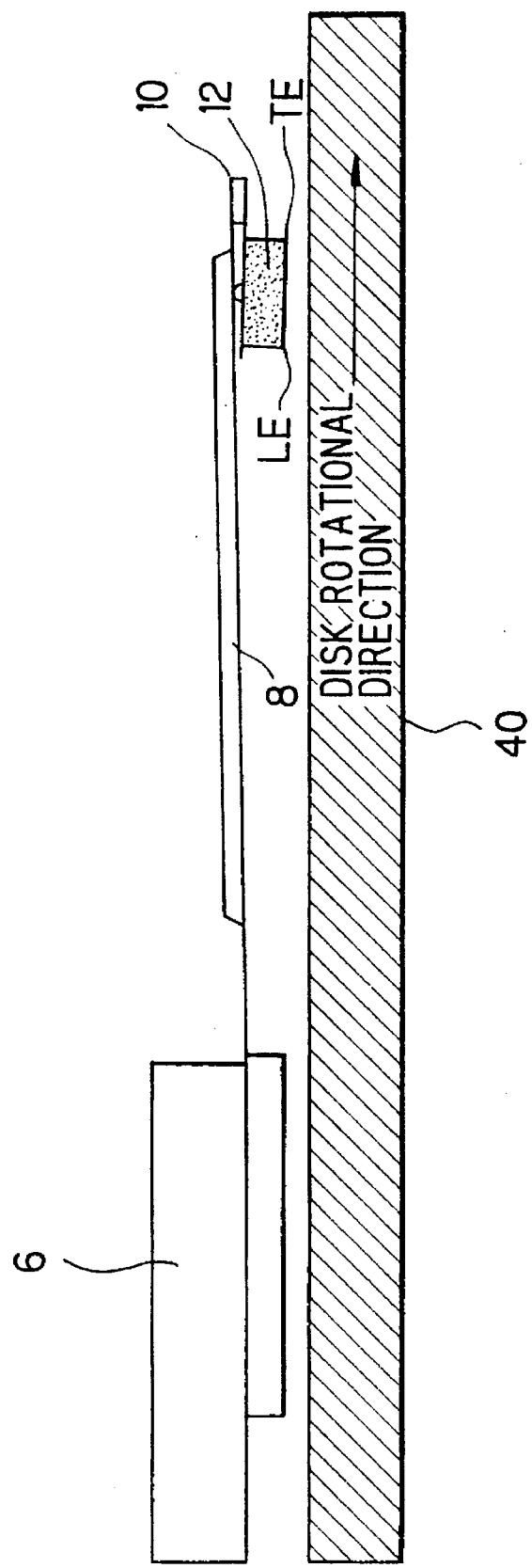
FIG. 13 is a side elevational view showing a relationship between a leading end and a trailing end of the slider and the disk surface in the loading and unloading operation in the embodiment shown in FIG. 1.

FIG. 13 shows a relationship between the leading end LE and the trailing end TE of the slider 12 and the disk surface in the loading operation and the unloading operation according to the embodiment shown in FIG. 1. As described above, by meeting the conditions $\theta p>0$ and $(\theta p-D)>0$, in the loading operation and the unloading operation, the leading end LE of the head slider 12 is always much further spaced from the disk 40 than the trailing end TE. Accordingly, a dynamic pressure due to an aerial film between the slider 12 and the disk 40 is likely to occur, and hence, a lifting force occur at the position where the slider 12 is located at a relatively high level. Thus, the slider 12 is not brought into contact with the disk 40, and the loading and unloading operation is well performed.

Figure 14:
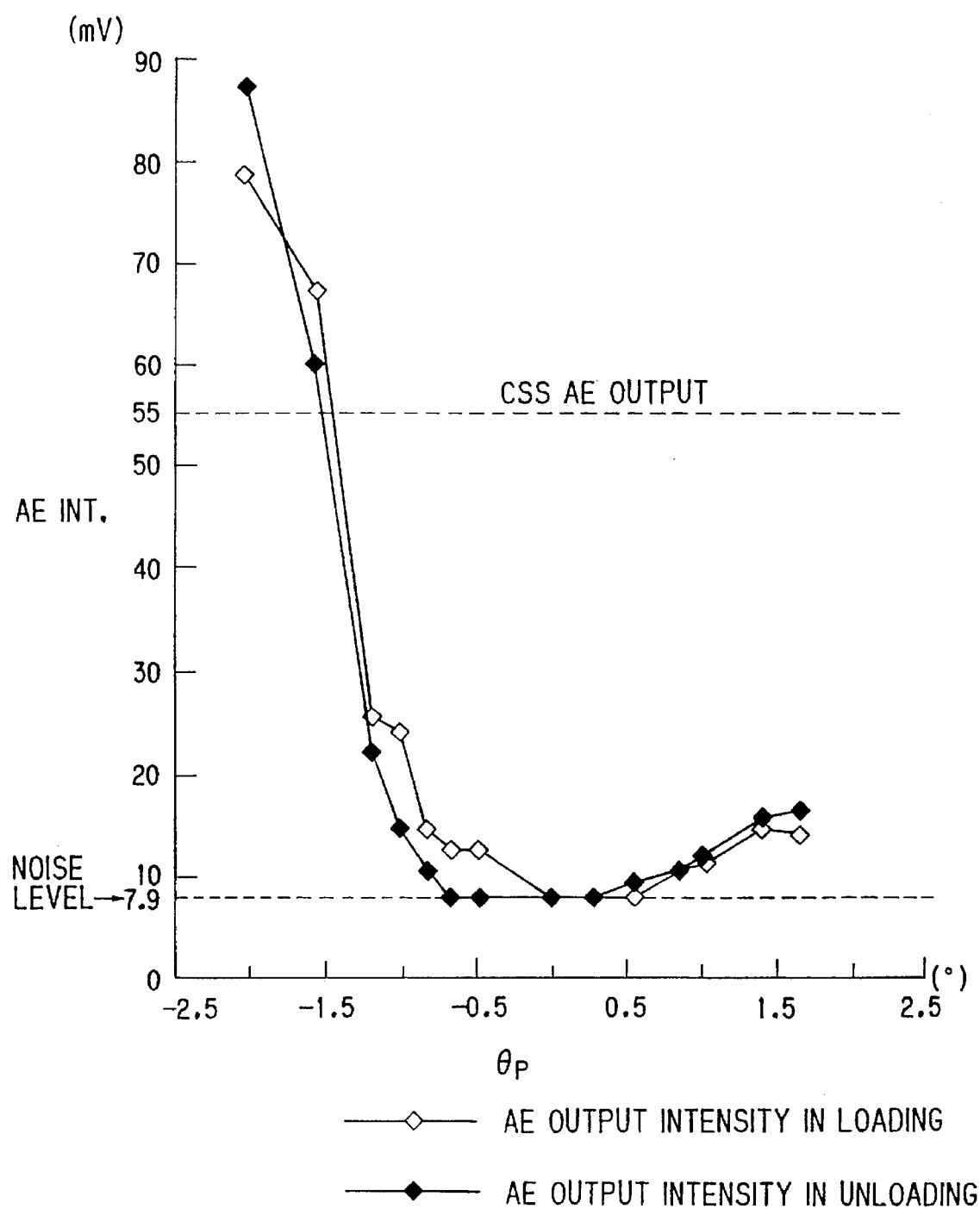
FIG. 14 is a graph showing a change in output of an AE sensor fixed to a suspension when an angle between a slider mount surface of a flexure and the suspension, i.e., a slider mount pitch angle $\theta p$ was changed.

FIG. 14 is a graph showing a change in an AE (acoustic emission) sensor fixed to the suspension 8 in the loading and the unloading in the case where the angle defined between the slider mount surface of the flexure and the suspension 8, i.e., the mount pitch angle θp is changed. The graph shows that the larger the AE intensity, the larger the collision energy will become. As is apparent from FIG. 14, it is preferable that the head slider mount surface of the flexure 10, i.e., the angle of the tongue 104 be about 0.3 degrees. Incidentally, the output of the AE sensor in case of the CSS system is about 55 mV.

Figure 15:
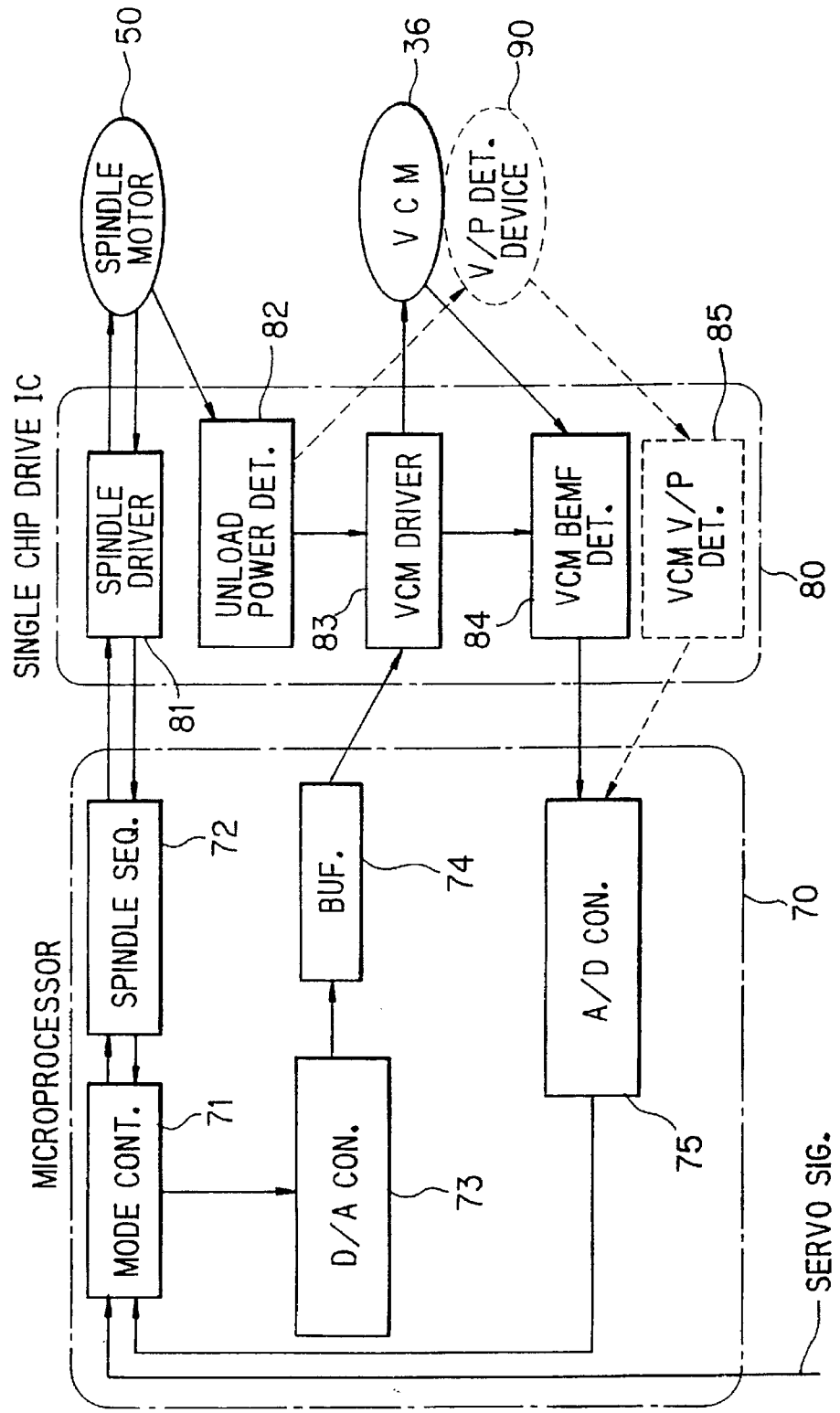
FIG. 15 is a block diagram showing an example of an arrangement of a control system according to the embodiment shown in FIG. 1.

FIG. 15 is an example of a control system for controlling the mechanical driver used in the embodiment shown in FIG. 1. The controlling system includes a microprocessor 70 and a chip drive IC 80. The microprocessor 70 is provided with a mode controller 71, a spindle sequencer 72, a D/A converter 73, a buffer 74 and an A/D converter 75. A single chip drive IC 80 is provided with a spindle driver 81, an unload power detector 82, a VCM driver 83, a VCM-BEMF detector 84 and a VCM velocity/position detector 85. The VCM velocity/position detector 85 corresponds to a velocity/position detecting device 90 provided exclusively for detecting the position and the velocity of the VCM 36. The VCM velocity/position detector 85 and the velocity/position detecting device 90 are provided for the purpose of performing super-low speed control of the VCM 36.

The mode controller 71 receives a servo signal and an output signal of the spindle sequencer 72 and the A/D converter 75 to control the operational modes of the VCM 36 and at the same time to control of modes such as a rotational stop/start of a spindle motor 50 for drivingly rotating the disk 40 and an on/off operation of the spindle servo. The spindle sequencer 72 receives an output signal of the mode controller 71 and the a feedback signal from the spindle driver 81 to select the rotational speed of the spindle motor 50 and to output an output signal representative of the rotational speed.

The spindle driver 81 receives the velocity signal from the spindle sequencer 72 to drive the spindle motor 50. In this example, the spindle motor 50 is of a three-phase full wave sensorless type and is not provided with a position detecting element such as a Hall element. The unload power detector 82 rectifies the reverse electromotive force of the spindle motor 50 in the off-state of the power source and supplies the VCM driver 83 and the velocity/position detecting device 90 with it.

The D/A converter 73 converts a digital signal outputted from the mode controller 71 into an analog signal. The buffer 74 is a prepositioned amplifier for inputting the output signal of the D/A converter 73 into the VCM driver 83. The driver 83 receives the output signal of the buffer 74 to drive the VCM 36.

The BEMF detector 84 outputs an analog signal representative of the position and the velocity of the VCM 36, from a reverse emf signal from the coil of the VCM 36 and the output signal of the VCM driver 83. The A/D converter 75 converts an analog signal outputted from the BEMF detector 84 or VCM velocity/position detector 85 into a digital signal to output it to the mode controller 71.

When data are written or read relative to the disk 40 under the normal use condition of the controlling system shown in FIG. 15, i.e., by the head, the VCM 36 is controlled through the mode controller 71, the D/A converter 73, the buffer 74 and the VCM driver 83 in accordance with the servo signal inputted into the microprocessor 70, and the spindle motor 50 is controlled through the mode controller 71, the spindle sequencer 72 and the spindle driver 81.

Figure 16:
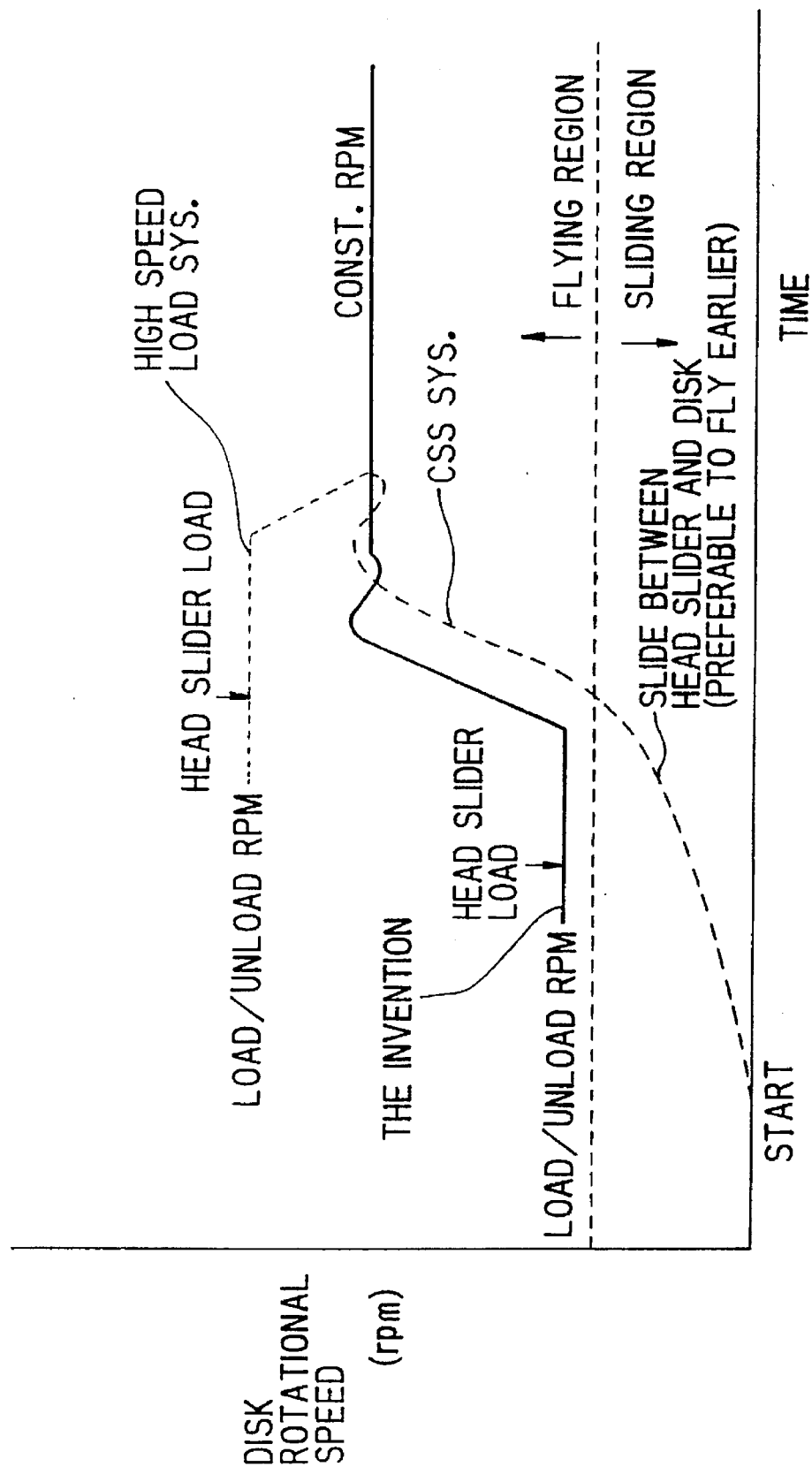
FIG. 16 is a graph showing an example of a disk rpm in the loading and unloading in the embodiment shown in FIG. 1.

FIG. 16 shows an example of the disk rpm in the loading and unloading in the embodiment shown in FIG. 1. As shown in FIG. 16, the spindle sequencer 72 and the spindle driver 81 shown in FIG. 15 control the spindle motor 50 so that the rpm of the disk 40 exceeds a flying minimum velocity of the head slider 12 in the loading/unloading operation and is at the same time smaller than a normal constant rpm.

Figure 17:
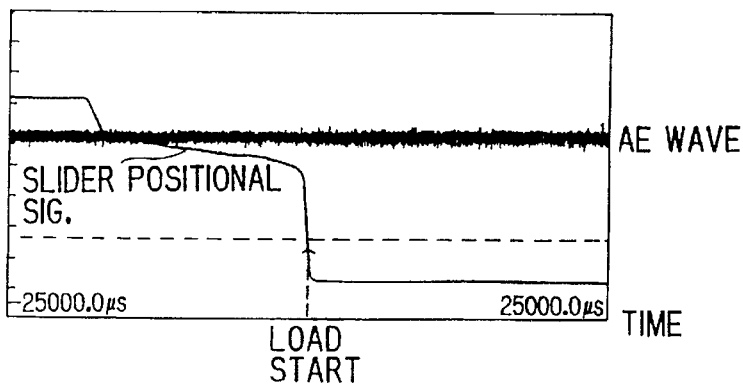
FIG. 17 is a graph showing an example of an output of an AE sensor fixed to a suspension when an rpm of the disk was not lower than a flying minimum speed of a head slider but lower than a constant rpm and the loading action was carried out.
Figure 18:
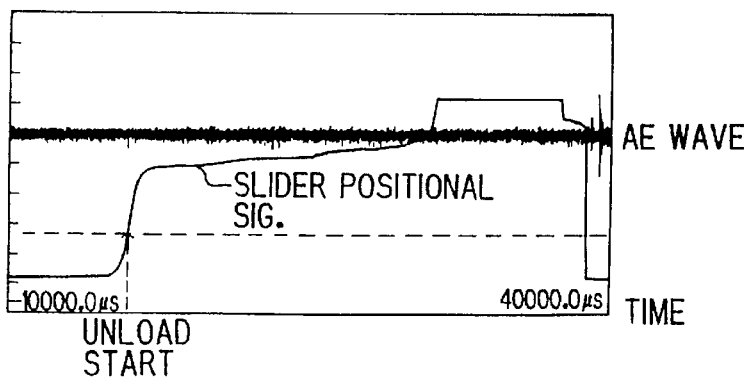
FIG. 18 is a graph showing an example of an output of the AE sensor fixed to the suspension when the rpm of the disk was not lower than the flying minimum speed of the head slider but lower than the constant rpm and the unloading action was carried out.
Figure 19:
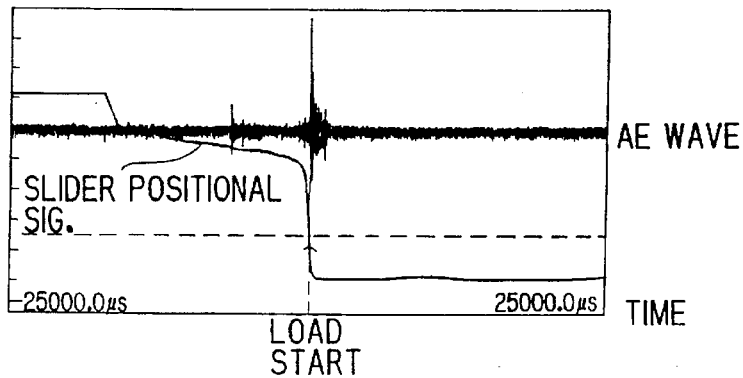
FIG. 19 is a graph showing an example of an output of an AE sensor fixed to a suspension when an rpm of the disk was kept at the normal constant rpm and the loading action was carried out.
Figure 20:
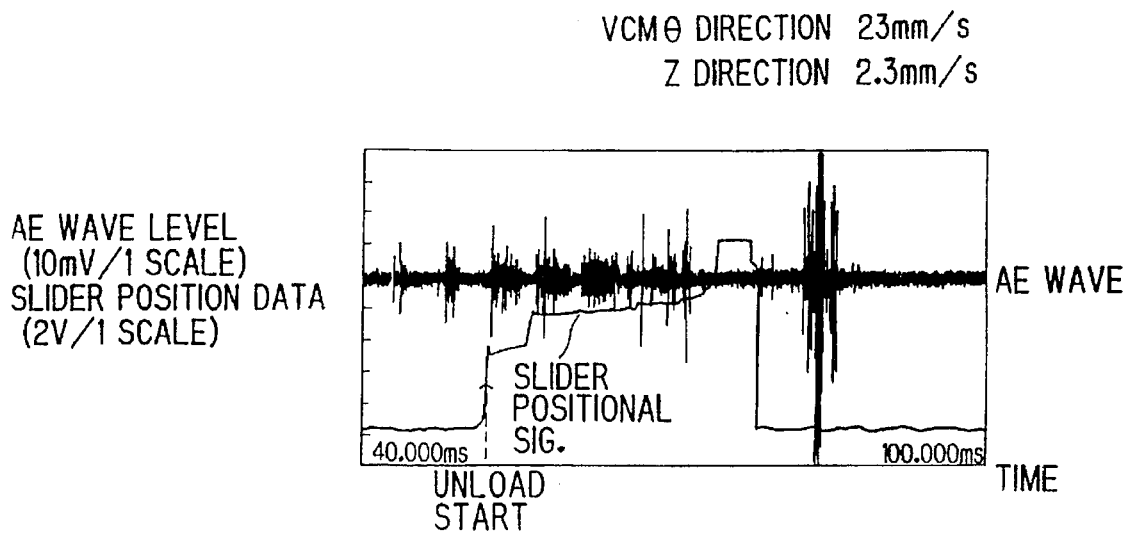
FIG. 20 is a graph showing an example of an output of the AE sensor fixed to the suspension when the rpm of the disk was kept at the normal constant rpm and the unloading action was carried out.
Figure 21:
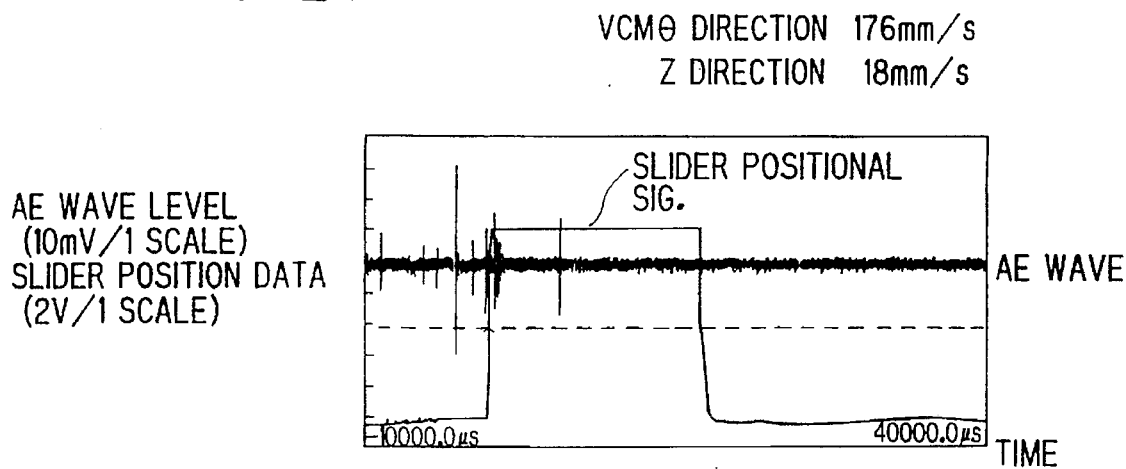
FIG. 21 is a graph showing an example of an output of an AE sensor fixed to a suspension in a first conventional article when an rpm of the disk was kept at the normal constant rpm and the loading action was carried out.
Figure 22:
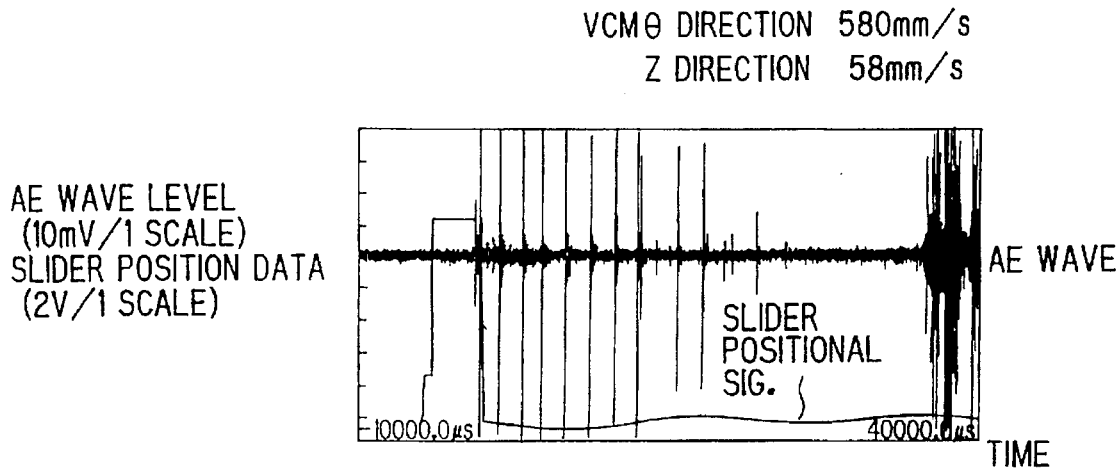
FIG. 22 is a graph showing an example of an output of the AE sensor fixed to the suspension in the first conventional article when the rpm of the disk was kept at the normal constant rpm and the unloading action was carried out.
Figure 23:
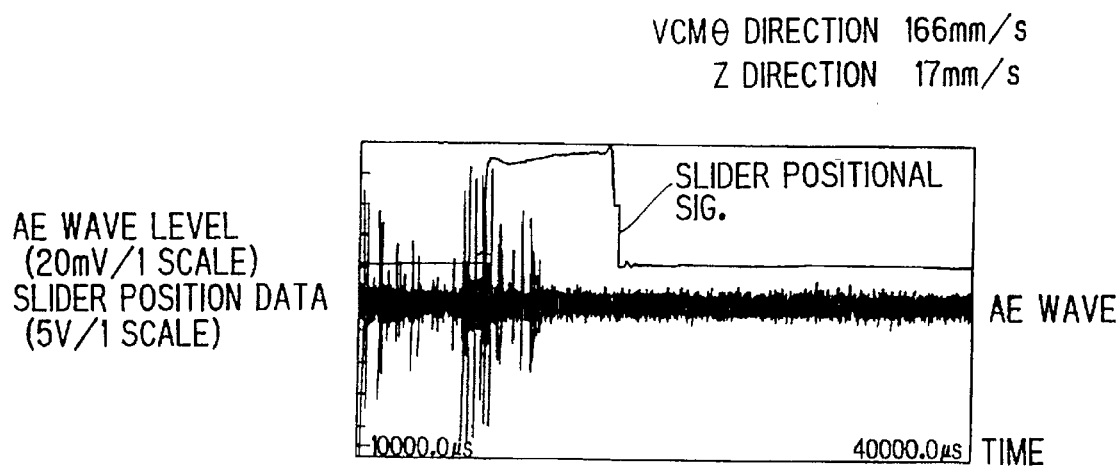
FIG. 23 is a graph showing an example of an output of an AE sensor fixed to a suspension in a second conventional article when an rpm of the disk was kept at the normal constant rpm and the loading action was carried out.
Figure 24:
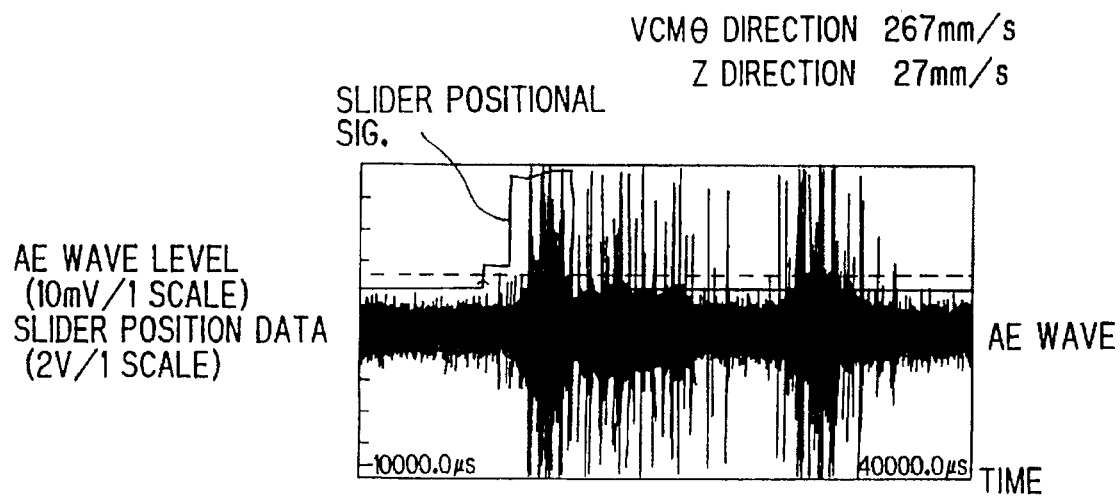
FIG. 24 is a graph showing an example of an output of the AE sensor fixed to the suspension in the second conventional article when the rpm of the disk was kept at the normal constant rpm and the unloading action was carried out.
Figure 25A:
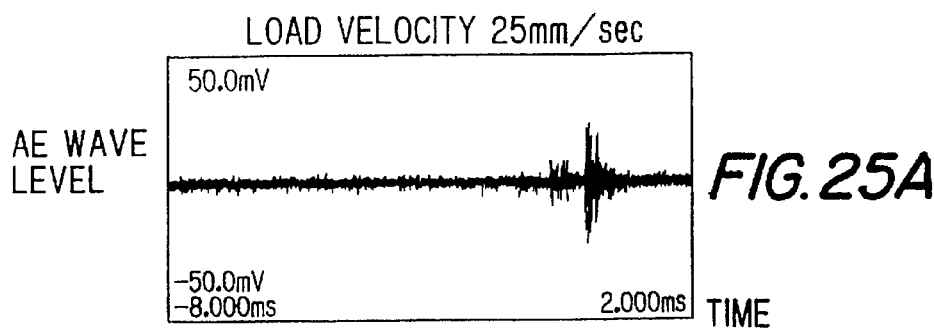
FIGS. 25A to 25E are graphs showing examples of an output of an AE sensor fixed to a suspension when the head loading speed in the direction perpendicular to the disk surface was changed while kept the head pitch angle at +0.135°.
Figure 25B:
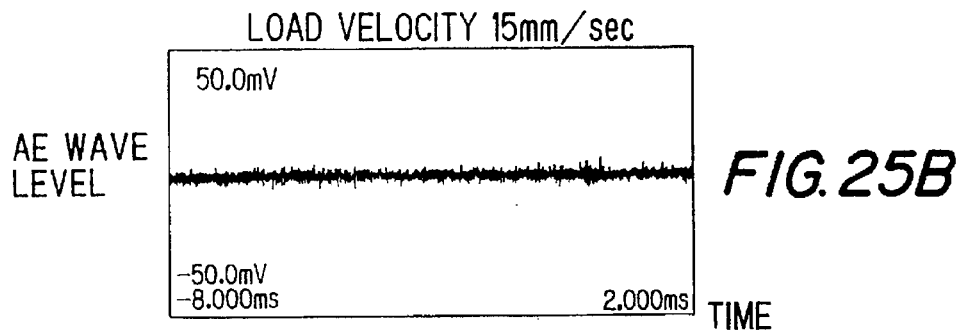
Figure 25C:
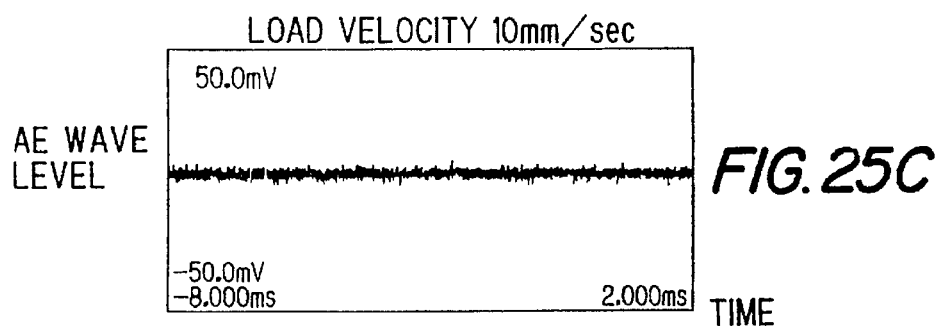
Figure 25D:
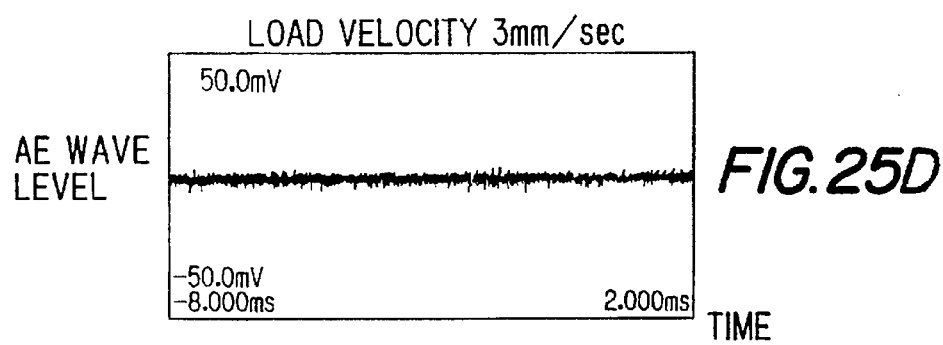
Figure 25E:
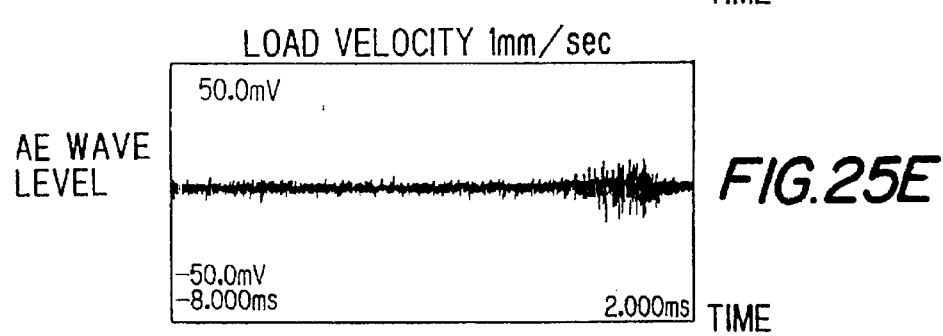
Figure 26A:
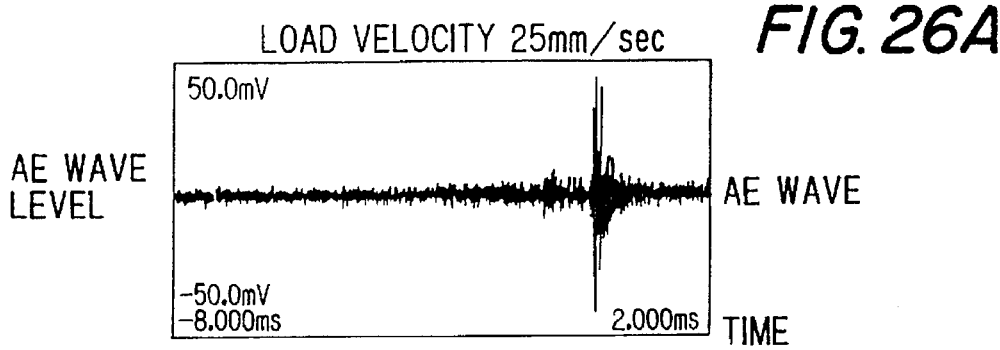
FIGS. 26A to 26E are graphs showing examples of an output of an AE sensor fixed to a suspension when the head loading speed in the direction perpendicular to the disk surface was changed while kept the head pitch angle at +0.235°.
Figure 26B:
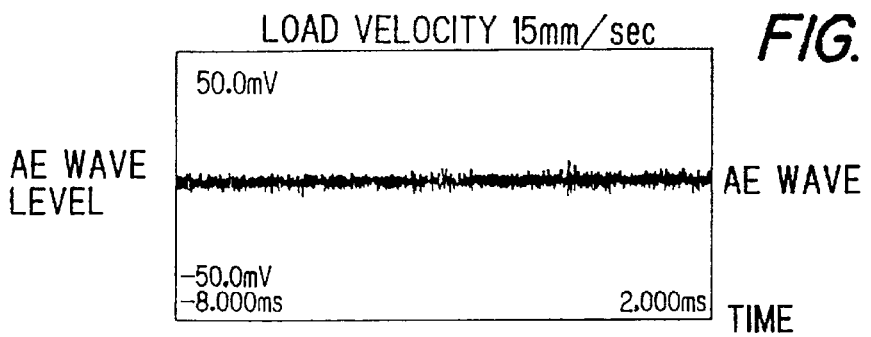
Figure 26C:
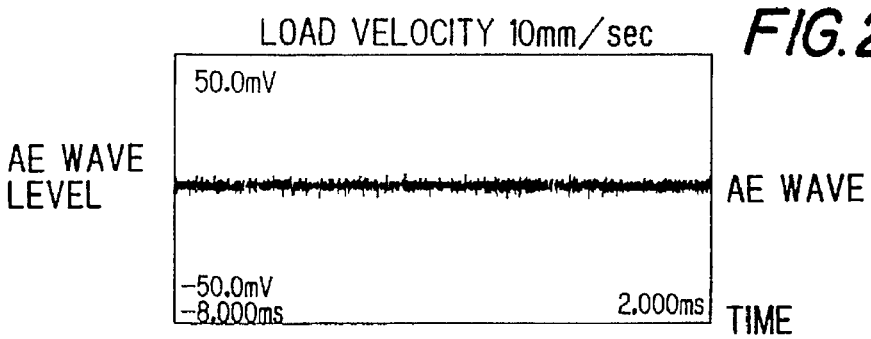
Figure 26D:
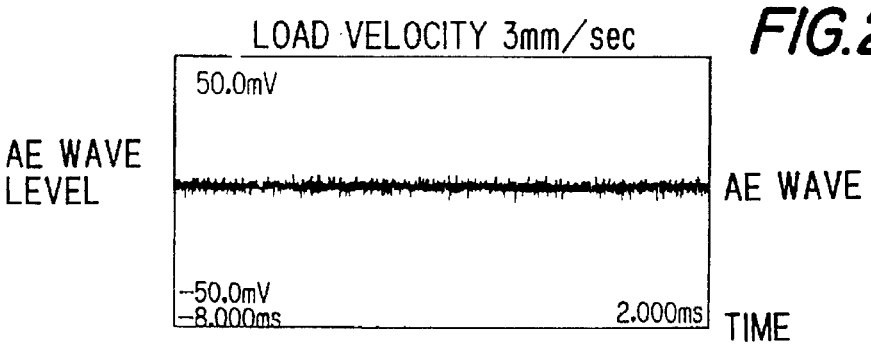
Figure 26E:
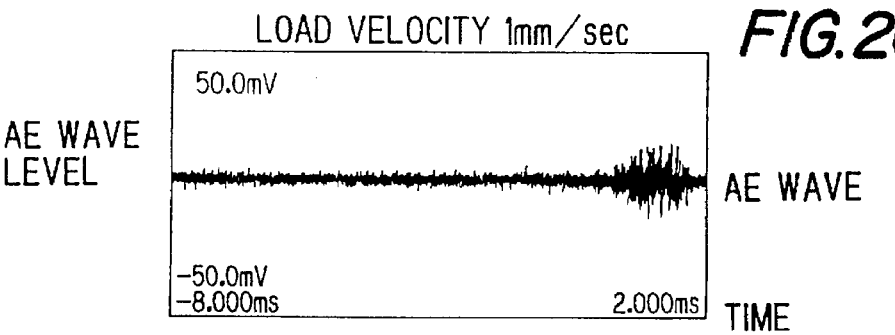

FIG. 17 shows an example of the output of the AE sensor fixed to the suspension 8 in the case where the rpm of the disk 40 exceeded the flying minimum velocity of the head slider 12 and was smaller than the constant rpm and the loading was carried out. FIG. 18 shows an example of the output of the AE sensor fixed to the suspension 8 in the case where the rpm of the disk 40 exceeded the flying minimum velocity of the head slider 12 and was smaller than the constant rpm and the unloading was carried out. FIG. 19 shows an example of the output of the AE sensor fixed to the suspension 8 in the case where the rpm of the disk 40 was kept at the constant rpm and the loading was carried out. FIG. 20 shows an example of the output of the AE sensor fixed to the suspension 8 in the case where the rpm of the disk 40 was kept at the constant rpm and the unloading was carried out. FIG. 21 shows an example of the output of the AE sensor fixed to a suspension in a first conventional article in the case where the rpm of the disk was kept at the constant rpm and the loading was carried out. FIG. 22 shows an example of the output of the AE sensor fixed to the suspension in the first conventional article in the case where the rpm of the disk was kept at the constant rpm and the unloading was carried out. FIG. 23 shows an example of the output of the AE sensor fixed to a suspension in a second conventional article in the case where the rpm of the disk was kept at the constant rpm and the loading was carried out. FIG. 24 shows an example of the output of the AE sensor fixed to the suspension in the second conventional article in the case where the rpm of the disk was kept at the constant rpm and the unloading was carried out. In these figures, a VCMθ direction means a radial direction of the disk, and a Z-direction means a direction perpendicular to the disk surface.

As is apparent from FIGS. 17 through 24, if the rotational speed (rpm) of the disk 40 is kept at a level not lower than the flying minimum velocity of the head slider 12 but lower than the constant rpm, the AE wave level, i.e., collision energy becomes small. Thus, the following advantages may be insured.

(a) Even if a roll angle or a pitch angle is generated, or even if the posture of the head slider 12 improper, it is possible to suppress the collision energy between the head slider 12 and the disk 40 at a minimum possible level.

(b) Even if the posture of the head slider 12 would be improper due to the manufacture allowance or assembling allowance of mechanical parts, it is possible to suppress the collision energy between the head slider 12 and the disk 40 at a minimum possible level.

(c) Even if the posture of the head slider 12 would be improper due to the external vibration or collision, it is possible to suppress the collision energy between the head slider 12 and the disk 40 at a minimum possible level.

(d) Unless the posture of the head slider 12 is improper, the collision energy between the head slider 12 and the disk 40 becomes zero.

Figure 27:
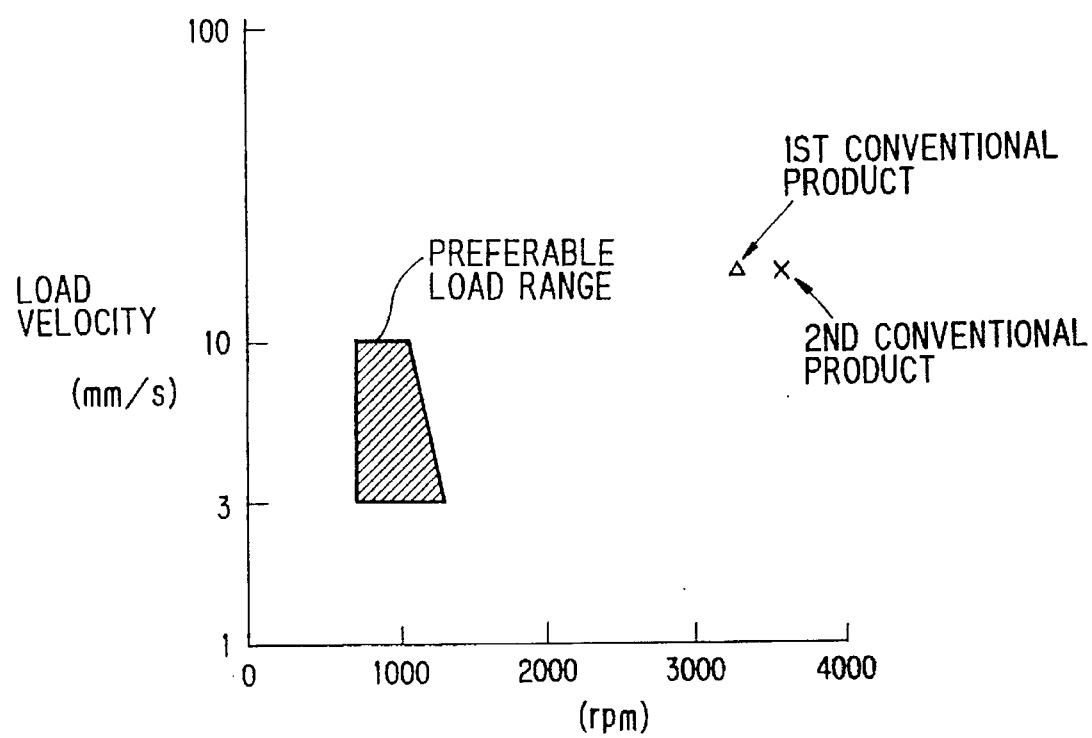
FIG. 27 is a graph showing a preferable range for the head loading speed in the direction perpendicular to the disk surface.
Figure 28:
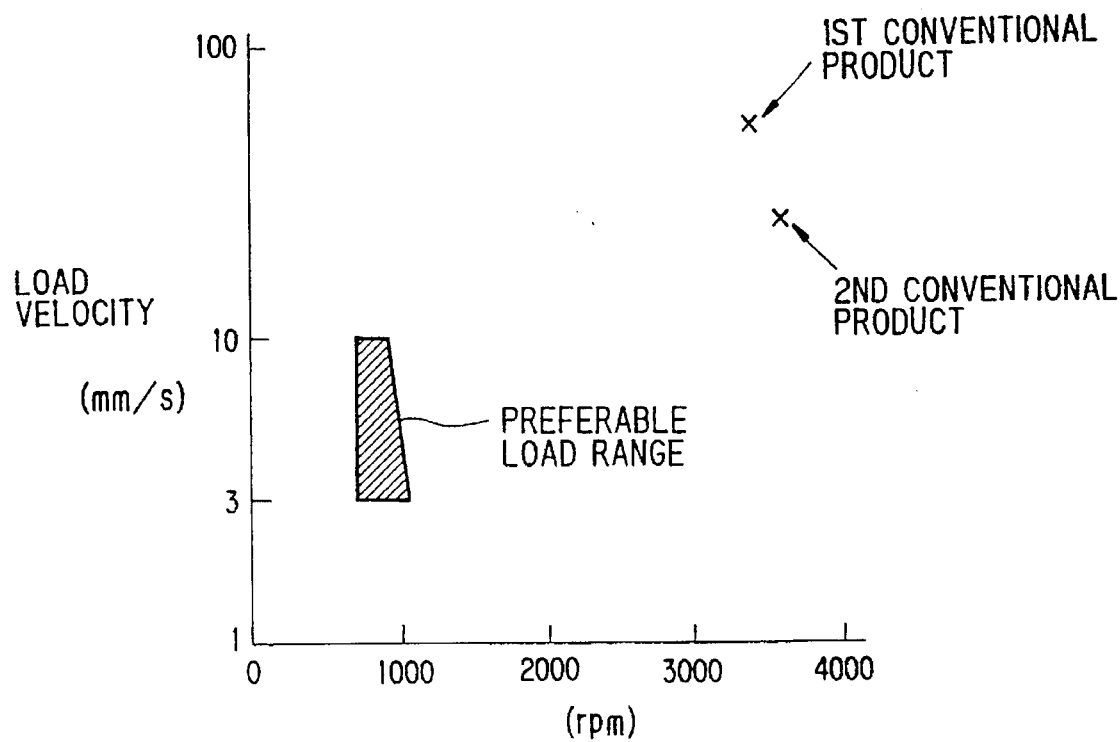
FIG. 28 is a graph showing a preferable range for the head unloading speed in the direction perpendicular to the disk surface.

FIGS. 25A to 25E show examples of outputs of the AE sensor fixed to the suspension in the case where the head loading speed in the direction perpendicular to the disk surface was changed while keeping the head pitch angle at +0.135°, and FIGS. 26A to 26E show examples of outputs of the AE sensor fixed to the suspension in the case where the head loading speed in the direction perpendicular to the disk surface was changed while keeping the head pitch angle at +0.235°. From the experimental results shown in FIGS. 25 and 26, the preferable range of the head loading speed in the direction perpendicular to the disk surface is not higher than 10 mm/sec but not lower than 3 mm/sec as shown in FIG. 27. Also, the preferable range of the head unloading speed in the direction perpendicular to the disk surface is not higher than 10 mm/sec but not lower than 3 mm/sec as shown in FIG. 28.

Figure 29:
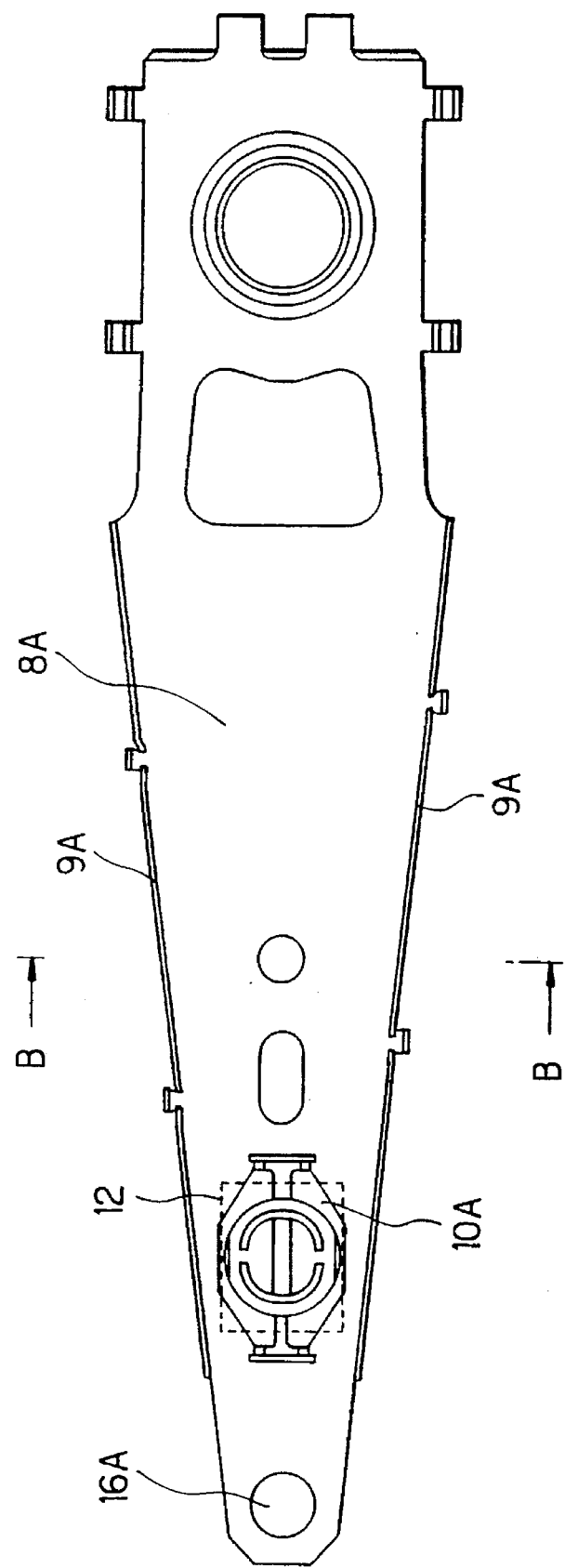
FIG. 29 is a bottom view showing a structure of a suspension, a flexure and a slider in accordance with a second embodiment of the invention which is applied to a magnetic disk drive.
Figure 30:
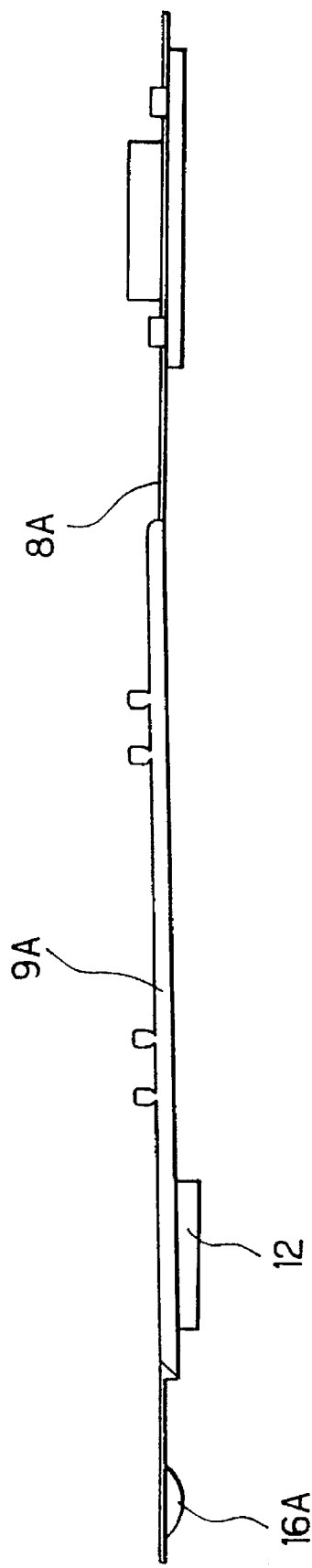
FIG. 30 is a side elevational view showing the structure of the suspension, the flexure and the slider in accordance with the second embodiment of the invention which is applied to the magnetic disk drive.
Figure 31:
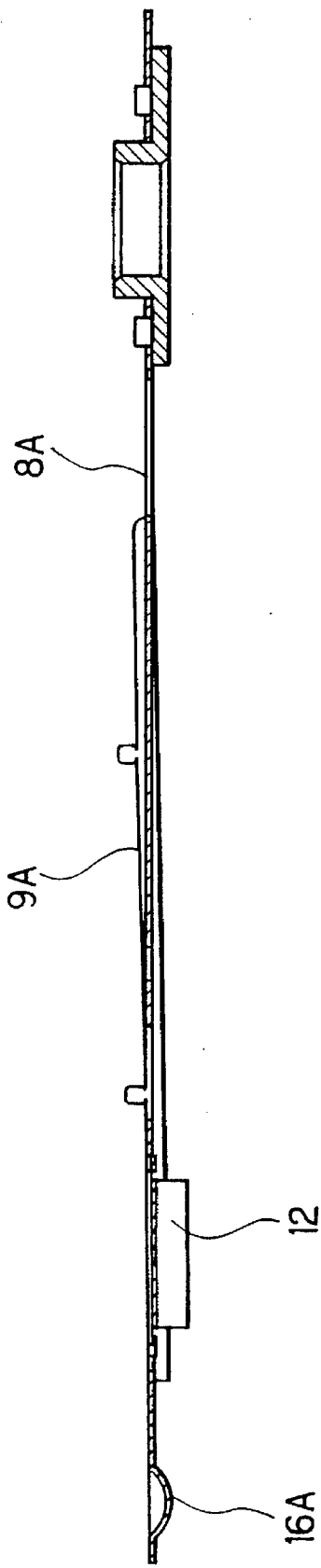
FIG. 31 is a longitudinal section view showing the suspension, flexure and slider shown in FIGS. 29 and 30.
Figure 32:
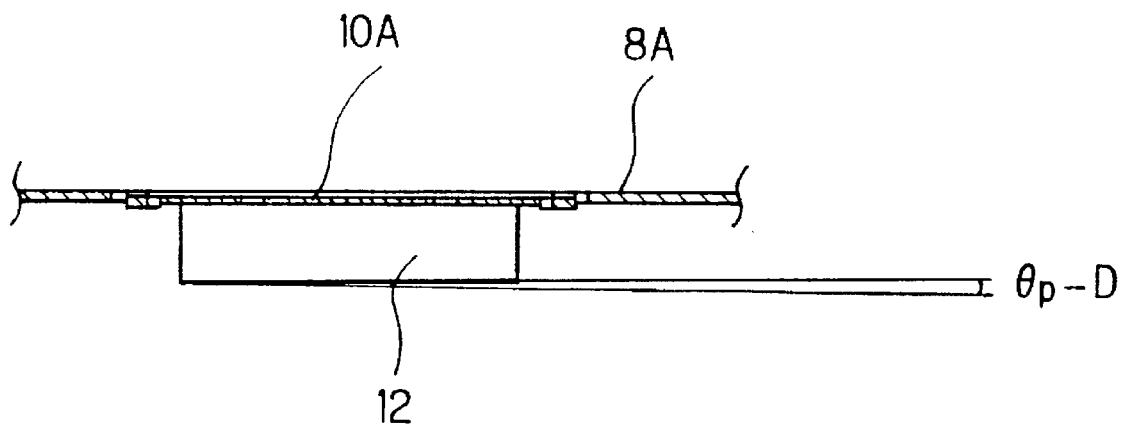
FIG. 32 is a fragmentary longitudinal sectional view showing a detail of the flexure shown in FIG. 31.
Figure 33:
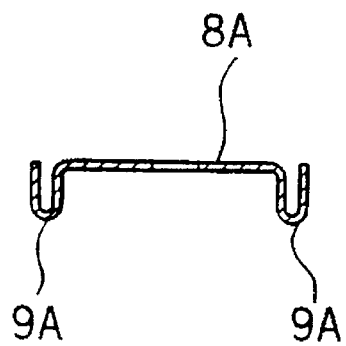
FIG. 33 is a cross-sectional view taken along the line B—B of FIG. 29.

FIGS. 29 and 30 are a bottom view and a side elevational view showing a structure of a suspension, a flexure and slider in accordance with a second embodiment of the invention which is applied to a magnetic hard disk drive. FIG. 31 is a longitudinal sectional view showing the suspension, flexure and the slider shown in FIGS. 29 and 30. FIG. 32 is a fragmentary sectional view showing a detail of the flexure shown in FIG. 31. FIG. 33 is a cross-sectional view taken along the line B—B of FIG. 29. Direct distinctions between the second embodiment shown in these figures and the first embodiment shown in FIGS. 1 to 5 are that in the second embodiment, a spherical projection 16A projecting toward the disk surface is directly formed on a suspension 8A, a flexure 10A is of a so-called round type, and flanges 9A formed on both sides of the suspension 8A have fold-back portions.

The flexure 10A is fixed to the suspension 8A so as to meet the relationship, θp>0. Accordingly, in the same manner as in the case shown in FIG. 8, the angle of the surface of the slider 12 to be mounted on the flexure 10A also meet the relationship, θp>0 and the angle between the surface of the slider 12 and the disk surface meets the relationship, (θp–D)>0. Accordingly, in the same manner as in the case shown in FIG. 8, the loading and unloading can be carried out without any contact between the slider 12 and the disk. Incidentally, the angle of the flexure 10A relative to the suspension 8A, i.e., the mount pitch angle θp of the head slider 12 is preferably approximately 0.3 degrees in the same manner as in FIG. 8.

Figure 34:
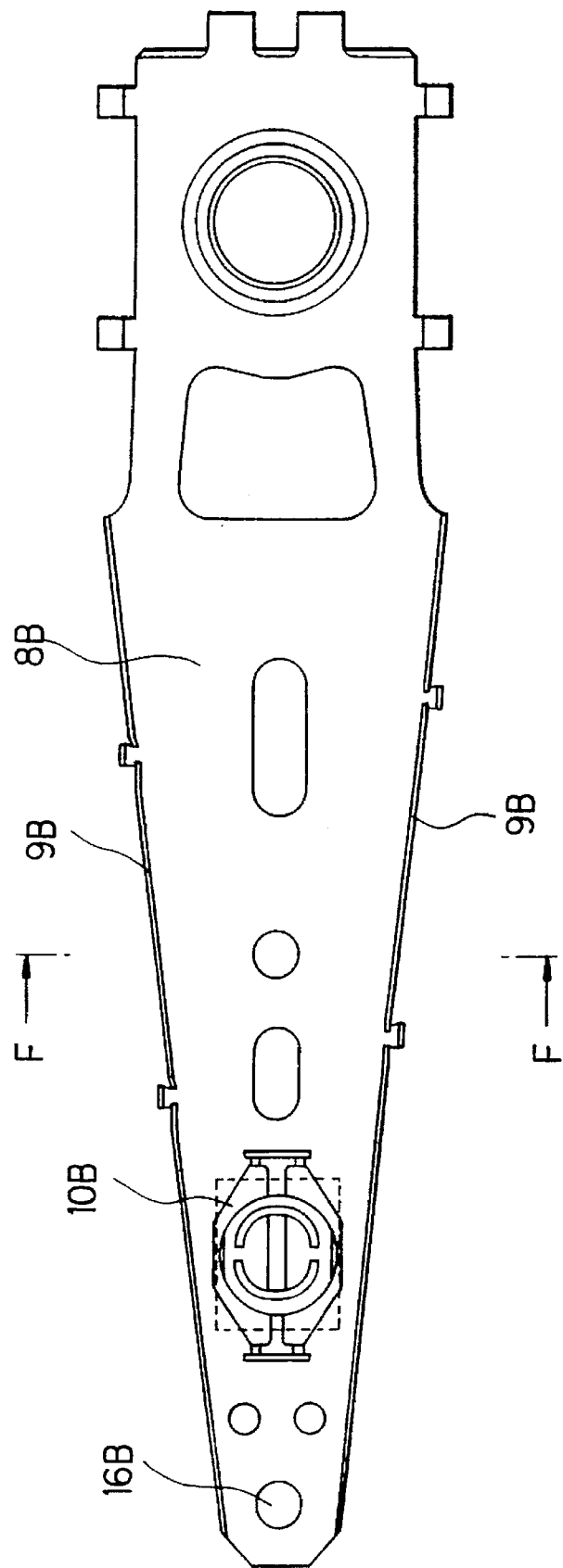
FIG. 34 is a bottom view showing a structure of a suspension and a flexure in accordance with a third embodiment of the invention which is applied to a magnetic disk drive.
Figure 35:
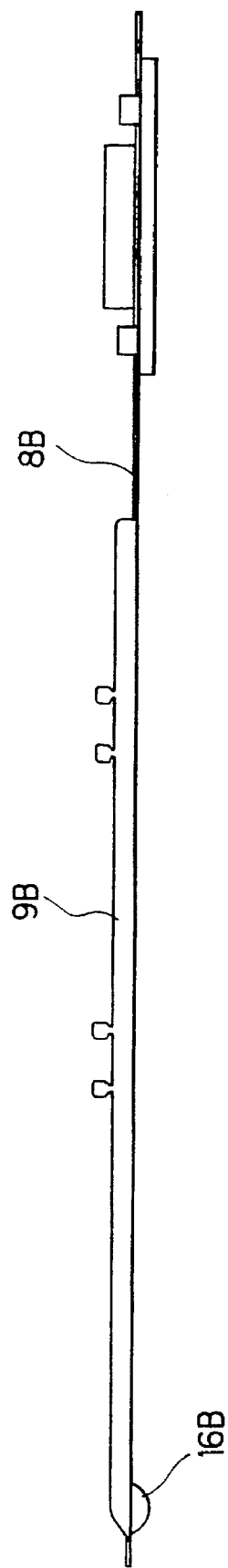
FIG. 35 is a side elevational view showing the structure of the suspension and the flexure in accordance with the third embodiment of the invention which is applied to the magnetic disk drive.
Figure 36:
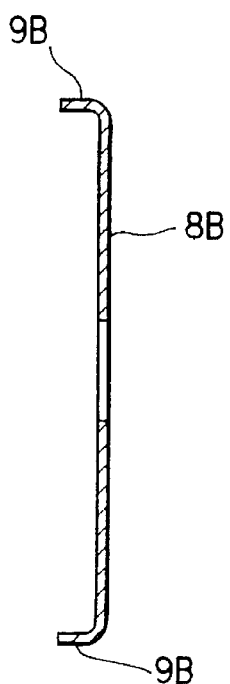
FIG. 36 is a cross-sectional view taken along the line F—F of FIG. 34.
Figure 37:
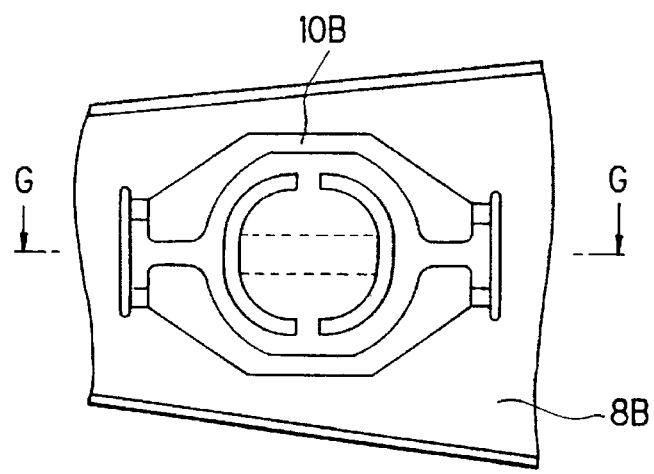
FIG. 37 is a bottom view showing a detail of the flexure shown in FIG. 34.
Figure 38:
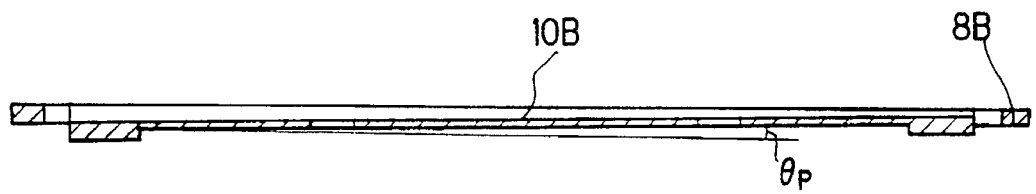
FIG. 38 is a longitudinal view taken along the line G—G of FIG. 37.

FIGS. 34 and 35 are a bottom view and a side elevational view showing a structure of a suspension and a flexure in accordance with a third embodiment of the invention which is applied to a magnetic hard disk drive. FIG. 36 is a cross-sectional view taken along the line F—F of FIG. 34. FIG. 37 is a bottom view showing a detail of the flexure shown in FIG. 34. FIG. 38 is a sectional view taken along the line G—G of FIG. 37. In the third embodiment, the spherical projection 16B projecting toward the disk surface is directly formed on the suspension 8B in the same manner as in the second embodiment shown in FIGS. 29 to 33 and the flexure 10B is of the so-called round type. A distinction between the second embodiment and the third embodiment is that the flanges 9B formed on both sides of the suspension 8B has no fold-back portions.

The flexure 10B is fixed to the suspension 8B so as to meet the relationship, θp>0. Accordingly, in the same manner as in the second embodiment, the angle of the surface of the slider 12 to be mounted on the flexure 10B also meet the relationship, θp>0. Incidentally, the angle of the flexure 10B relative to the suspension 8B, i.e., the mount pitch angle θp of the head slider 12 is preferably approximately 0.3 degrees in the same manner as in the second embodiment.

Figure 39:
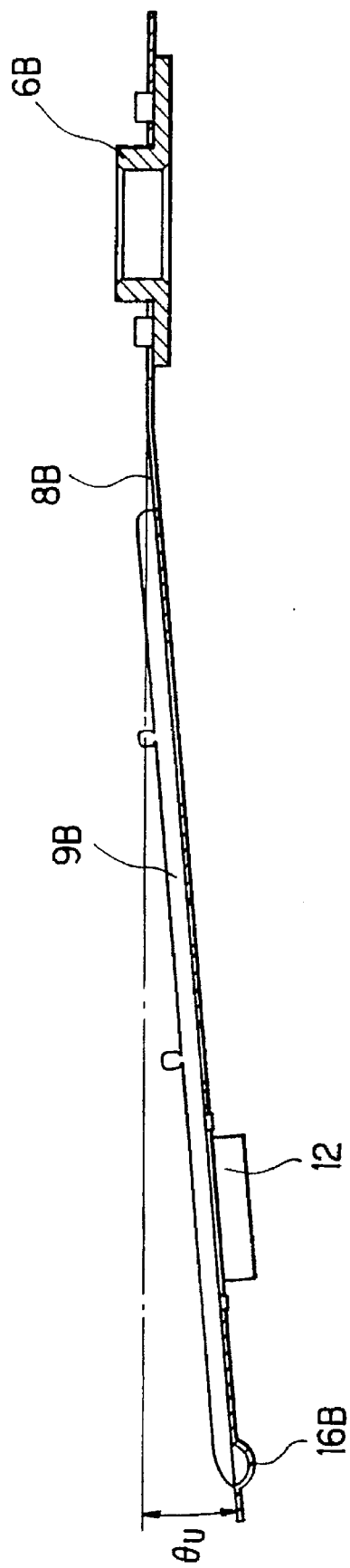
FIG. 39 is a longitudinal view showing a state of the suspension, flexure and slider in unloading in the third embodiment of the invention.
Figure 40:
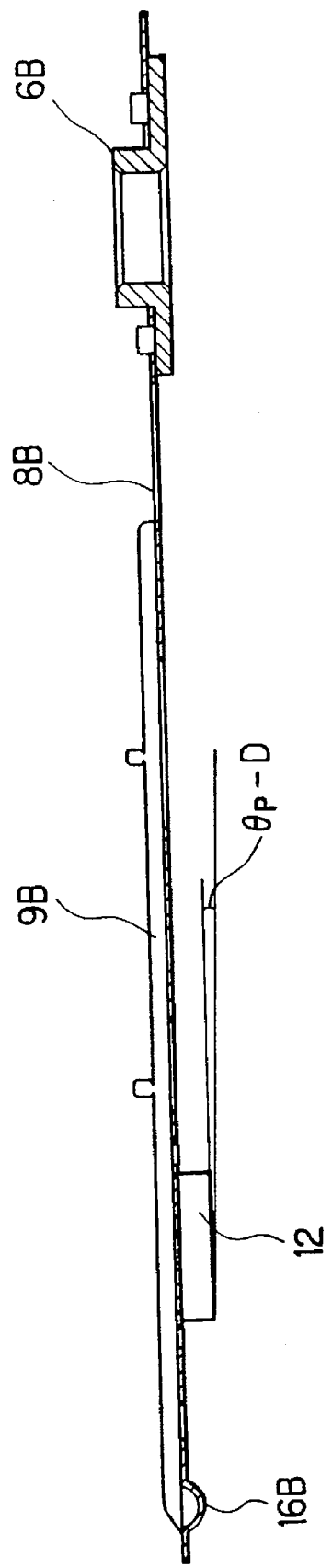
FIG. 40 is a longitudinal view showing a state of the suspension, flexure and slider in loading in the third embodiment of the invention.
Figure 41:
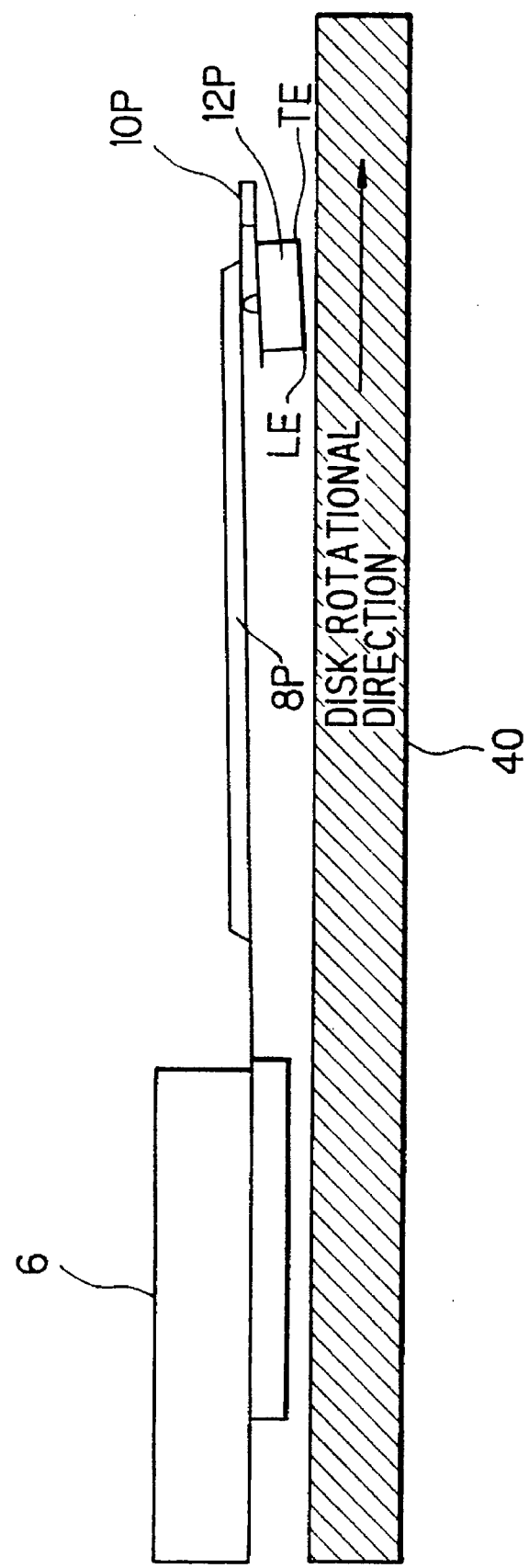
FIG. 41 is a side elevational view showing a relationship between a leading end and a trailing end of a slider and the disk surface in loading and unloading according to the prior art.

FIG. 39 is a longitudinal sectional view showing a state of the suspension, the flexure and the slider in the unloading according to the third embodiment of the invention, and FIG. 40 is a longitudinal sectional view showing a state of the suspension, the flexure and the slider in the loading according to the third embodiment of the invention. As shown in FIG. 40, the angle between the surface of the slider 12 and the disk surface meets the relationship, (θp–D)>0. Accordingly, the loading and unloading can be carried out without any contact between the slider 12 and the disk.

In the foregoing embodiments, the arm which supports the head is arranged above the magnetic disk but the present invention is not limited thereto. The invention may be applied to the case where the arm is arranged below the magnetic disk.

Also, the present invention is not limited to the application where a single magnetic disk is used. It is apparent for those skilled in the art to apply the invention to the case where a plurality of magnetic disks are used.

Furthermore, the present invention is not limited to the magnetic disk and may be applied to an optical disk or a magnetoptical disk.

In the first disk device according to the invention, since the projection which is engaged with the slant surface of the slant base in the loading and unloading arranged at the end portion beyond the flexure mount position of the suspension, it is possible to reduce the force for lifting the head slider during the unloading operation. Also, since the projection has a spherical surface, the projection may come into point contact with the slant surface to thereby decrease the sliding area, suppress the contamination due to the sliding movement and make the sliding resistance stable. Also, since the projection is in point contact with the slant surface, it is unnecessary to strictly enhance the arrangement precision. Furthermore, since the suspension is engaged with the slant surface through the spherical projection, the suspension may take a rolling motion about the spherical projection. As a result, the posture of the head slider supported by the suspension may be keep in parallel.

In the second disk device according to the present invention, since the height of the head slider when the projection of the suspension is positioned in the recess of the slant base is equal to the height of the head slider when the head slider effects the write and read to the disk, the load to be imposed on the suspension in the normal operation and the lock state (parking state) is made uniform to thereby avoid a loading loss.

In the third disk device according to the present invention, since the head slider mount surface of the flexure is slanted so that a spaced distance of the leading end Of the head slider relative to the disk is longer than a spaced distance of the trailing end of the head slider relative to the disk, in the loading and unloading, the leading end of the head slider is always further spaced away from the disk than the trailing end so that the loading and unloading may be carried out without any contact between the slider and the disk. Even if the slider and the disk would be brought into contact with each other, the contact is very weak so that the damage of the slider and the disk is small and any fatal damage would hardly occur.

In the fourth disk according to the present invention, since the rpm of the disk is controlled at a level exceeding the flying minimum speed of the head slider but smaller than the constant rpm in at least one of the loading and unloading operations, even if the head slider and the disk would be brought into contact with each other, it is possible to reduce the collision energy.

What is claimed is:

1. A disk device for moving an arm which supports a head slider and for positioning said head slider at a predetermined position of a disk, comprising:

a suspension having a longitudinal axis and being fixed at a first end to said arm along said longitudinal axis;

a flexure having a fastening portion fixed at a second end of said suspension, a tongue portion having a longitudinal axis aligned with the longitudinal axis of said suspension and having a mounting surface on which said head slider is mounted, and a pair of thin flexible outer fingers extending in parallel relation to said tongue portion from said fastening portion, wherein said tongue portion has a positive mount pitch angle relative to said fingers so that a spaced distance of a leading end of said head slider relative to said disk is greater than a spaced distance of a trailing end of said head slider relative to said disk;

a spherical projection provided to project toward said disk at the second end beyond the flexure mount position of said suspension;

a slant base on which said spherical projection directly rides which is provided with a slant surface which has an increasing slope from said disk in accordance with a radial outward distance of said disk, a flat surface which is parallel to the surface of the disk contiguous with said slant surface, and a recess portion which is contiguous with said flat surface and has an elongated portion thereof which is parallel to the surface of the disk for defining a lock position of said head slider;

drive means for moving said arm so that said projection is moved in engagement with said slant surface in loading and unloading operations of the arm; and wherein a height of said elongated portion of said recess portion of said slant base is selected so that a height of said head slider when said spherical projection rides along said elongated portion of said recess portion is equal to a height of said head slider when said head slider effects a writing operation and a reading operation relative to said disk.

2. The disk device according to claim 1, wherein said projection is formed on a projection carrying plate which is discrete from said suspension, said projection carrying plate being fixed to said suspension.

3. The disk device according to claim 1, wherein said projection is formed integrally with said suspension.

4. The disk device according to claim 3, wherein said suspension has flanges at its periphery, and a flat region, provided with no flanges, between said flexure and said spherical projection.

5. A disk device for moving an arm which supports a head slider and for positioning said head slider at a predetermined position of a disk, comprising:

a suspension having a longitudinal axis and being fixed at a first end to said arm along said longitudinal axis;

a flexure having a fastening portion fixed at a second end of said suspension, a tongue portion having a longitudinal axis aligned with the longitudinal axis of said suspension and having a mounting surface on which said head slider is mounted, and a pair of thin flexible outer fingers extending in parallel relation to said tongue portion from said fastening position, wherein said tongue portion has a positive mount pitch angle relative to said fingers so that a spaced distance of a leading end of said head slider relative to said disk is greater than a spaced distance of a trailing end of said head slider relative to said disk;

a spherical projection at the second end beyond the flexure mount position of said suspension which projects toward said disk;

a slant base on which said spherical projection directly rides which is provided with a slant surface which has an increasing slope from said disk in accordance with a radial outward distance of said disk, a flat surface which iS parallel to the surface of the disk contiguous with said slant surface, and a recess portion which is contiguous with said flat surface and has an elongated portion thereof which is parallel to the surface of the disk for defining a lock position of said head slider;

drive means for moving said arm so that said spherical projection is moved in engagement with said slant surface in loading and unloading operations of the arm;

wherein in at least one of said loading and unloading operations of the arm, a speed of said head slider in a direction perpendicular to a surface of said disk is not higher than 10 mm/sec but not lower than 3 mm/sec; and wherein a height of said elongated portion of said recess portion of said slant base is selected so that a height of said head slider when said spherical projection rides along said elongated portion of said recess portion is equal to a height of said head slider when said head slider effects a writing operation and a reading operation relative to said disk.

6. The disk device according to claim 5, wherein said projection is formed on a projection carrying plate which is discrete from said suspension, said projection carrying plate being fixed to said suspension.

7. The disk device according to claim 5, wherein said projection is formed integrally with said suspension.

8. The disk device according to claim 7, wherein said suspension has flanges at its periphery, and a flat region, provided with no flanges, between said flexure and said spherical projection.

9. A disk device for moving an arm which supports a head slider and for positioning said head slider at a predetermined position of a disk, comprising:

a suspension having a longitudinal axis and being fixed at a first end to said arm along said longitudinal axis;

a flexure having a fastening portion fixed at a second end of said suspension, a tongue portion having a longitudinal axis aligned with the longitudinal axis of said suspension and having a mounting surface on which said head slider is mounted, and a pair of thin flexible outer fingers extending in parallel relation to said tongue portion from said fastening portion wherein said tongue portion has a positive mount pitch angle relative to said fingers so that a spaced distance of a leading end of said head slider relative to said disk is greater than a spaced distance of a trailing end of said head slider relative to said disk;

a slant base provided with a slant surface which has an increasing slope from said disk in accordance with a radial outward distance of said disk, a flat surface which is parallel to the surface of the disk contiguous with said slant surface, and a recess portion which is contiguous with said flat surface and has an elongated portion thereof which is parallel to the surface of the disk for defining a lock position of said head slider;

a spherical projection provided in said suspension which directly rides on said slant base in loading and unloading operations of the arm;

wherein a height of said elongated portion of said recess portion of said slant base is selected so that a height of said head slider when said spherical projection rides along said elongated portion of said recess portion is equal to a height of said head slider when said head slider effects a writing operation and a reading operation relative to said disk.

10. The disk device according to claim 9, wherein said spherical projection projects toward said disk.

11. The disk device according to claim 10, wherein said projection is formed on a projection carrying plate which is discrete from said suspension, said projection carrying plate being fixed to said suspension.

12. The disk device according to claim 10, wherein said projection is formed integrally with said suspension.

13. The disk device according to claim 12, wherein said suspension has flanges at its periphery, and a flat region, provided with no flanges, between said flexure and said spherical projection.

14. A disk device for moving an arm which supports a head slider and for positioning said head slider at a predetermined position of a disk during loading and unloading operations of the arm, comprising:

a suspension having a longitudinal axis and being fixed at a first end to said arm along said longitudinal axis; and a flexure having a fastening portion fixed at a second end of said suspension, a tongue portion having a longitudinal axis aligned with the longitudinal axis of said suspension and having a mounting surface on which said head slider is mounted, and a pair of thin flexible outer fingers extending in parallel relation to said tongue portion from said fastening portion a slant base provided with a slant surface which has an increasing slope from said disk in accordance with a radial outward distance of said disk, a flat surface which is parallel to the surface of the disk contiguous with said flat surface, and a recess portion which is contiguous with said flat surface and has an elongated portion thereof which is parallel to the surface of the disk for defining a lock position of said head slider;

a spherical projection provided in said suspension which directly rides on said slant base in loading and unloading operations of the arm;

wherein said tongue portion has a positive mount pitch angle relative to said fingers so that a spaced distance of a leading end of said head slider relative to said disk is greater than a spaced distance of a trailing end of said head slider relative to said disk; and wherein a height of said elongated portion of said slant base is selected so that a height of said head slider when said spherical projection rides along said elongated portion of said recess portion is equal to a height of said head slider when said head slider effects a writing operation and a reading operation relative to said disk.

15. The disk device according to claim 14, wherein the angle for said head slider mount surface of said flexure is approximately 0.3 degrees.

16. The disk device of claim 14 and further comprising:

control means for controlling a rotational speed of said disk so that the rotational speed is not lower than a flying minimum speed of said head slider and is lower than a normal constant speed in at least one of the loading and unloading operations of the arm.

17. The disk device of claim 14 and further comprising:

drive means for moving said arm so that said spherical projection is moved in engagement with said slant surface in said loading and unloading.

18. The disk device according to claim 17, wherein said spherical projection projects toward said disk.

19. The disk device according to claim 18, wherein said projection is formed on a projection carrying plate which is discrete from said suspension, said projection carrying plate being fixed to said suspension.

20. The disk device according to claim 18, wherein said projection is formed integrally with said suspension.

21. The disk device according to claim 20, wherein said suspension has flanges at its periphery, and a flat region, provided with no flanges, between said flexure and said spherical projection.

22. A disk device having a suspension for moving an arm which supports a head slider and for positioning said head slider at a predetermined position of said disk, said disk device comprising:

an arm mount region having a longitudinal axis and being fixed to said arm at a first end thereof along said longitudinal axis;

a flexure region having a fastening portion fixed at a second end of said arm mount region, a tongue portion having a longitudinal axis aligned with the longitudinal axis of said arm mount region and having a mounting surface on which said head slider is mounted, and a pair of thin flexible outer fingers extending in parallel relation to said tongue portion from said fastening portion, and wherein said tongue portion has a positive mount pitch angle relative to said fingers so that a spaced distance of a leading end of said head slider relative to said disk is greater than a spaced distance of a trailing end of said head slider relative to said disk; and a spherical projection provided to project to said disk at the second end of said arm mount region beyond the flexure region;

a slant base on which said spherical projection directly rides which is provided with a slant surface which has an increasing slope from said disk in accordance with a radial outward distance of said disk, a flat surface which is parallel to the surface of the disk contiguous with said slant surface, and a recess portion which is contiguous with said flat surface and has an elongated portion thereof which is parallel to the surface of the disk for defining a lock position of said head slider; and wherein a height of said elongated portion of said recess portion of said slant base is selected so that a height of said head slider when said spherical projection rides along said elongated portion of said recess portion is equal to a height of said head slider when said head slider effects a writing operation and a reading operation relative to said disk.

23. The suspension according to claim 22, wherein said projection is formed on a projection carrying plate which is discrete from said flexure region, said projection carrying plate being fixed to said flexure region.

24. The suspension according to claim 22, wherein said projection is formed integrally with said flexure region.

25. The suspension according to claim 24, having flanges at its periphery, and having a flat region, provided with no flanges, between said flexure mount position and said spherical projection.

26. The suspension according to claim 22, wherein the angle for said head slider mount surface of said flexure region is approximately 0.3 degrees.

* * * * *